United States Patent
Yamaguchi et al.

(10) Patent No.: US 7,143,436 B2
(45) Date of Patent: Nov. 28, 2006

(54) DEVICE AUTHENTICATION MANAGEMENT SYSTEM

(75) Inventors: Kensaku Yamaguchi, Kanagawa (JP); Hideaki Nakakita, Kanagawa (JP); Mikio Hashimoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 849 days.

(21) Appl. No.: 10/253,644

(22) Filed: Sep. 25, 2002

(65) Prior Publication Data

US 2003/0061518 A1  Mar. 27, 2003

(30) Foreign Application Priority Data

Sep. 25, 2001  (JP) ............... 2001-292581

(51) Int. Cl.
G06F 15/173 (2006.01)
H04N 1/44 (2006.01)
G06F 15/16 (2006.01)
H04L 9/00 (2006.01)

(52) U.S. Cl. ............... 726/6; 713/168; 726/15; 380/277

(58) Field of Classification Search ............ None
See application file for complete search history.

(56) References Cited

U.S. PATENT DOCUMENTS 6,185,308 B1 * 2/2001 Ando et al. ............ 713/168
6,185,682 B1 * 2/2001 Tang ..................... 713/168
6,289,451 B1 * 9/2001 Dice ..................... 713/168

FOREIGN PATENT DOCUMENTS

| JP | 09-083509 | 3/1997 |
| JP | 9-252294 | 9/1997 |
| JP | 2000-196616 | 7/2000 |
| JP | 2000-253459 | 9/2000 |
| JP | 2001-111543 | 4/2001 |
| WO | WO 99/27654 | 6/1999 |

* cited by examiner

*Primary Examiner*—Gilberto Barron
*Assistant Examiner*—Laurel Lashley
(74) *Attorney, Agent, or Firm*—Oblon, Spivak, McClelland, Maier & Neustadt, P.C.

(57) ABSTRACT

In a device authentication management system in which a device acquires a secret information from an authentication management unit and carries out an authentication in order to carry out communications with another device by using the secret information, the authentication management unit generates the secret information that contains a first authentication information for carrying out communications between the authentication management unit and the device, and a second authentication information for carrying out communications between the device and the another device; carries out the authentication in order to carry out communications with the device, by using the first authentication information; and transmits the second authentication information according to the authentication.

20 Claims, 22 Drawing Sheets

M : MASTER KEY (TO BE USED FOR DELIVERY OF COMMON KEY)
K : COMMON KEY

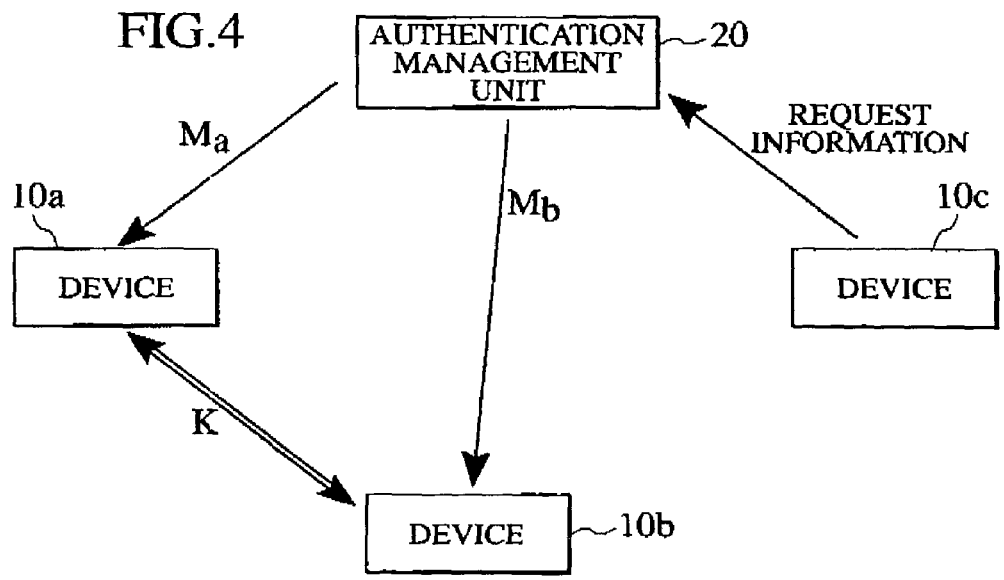
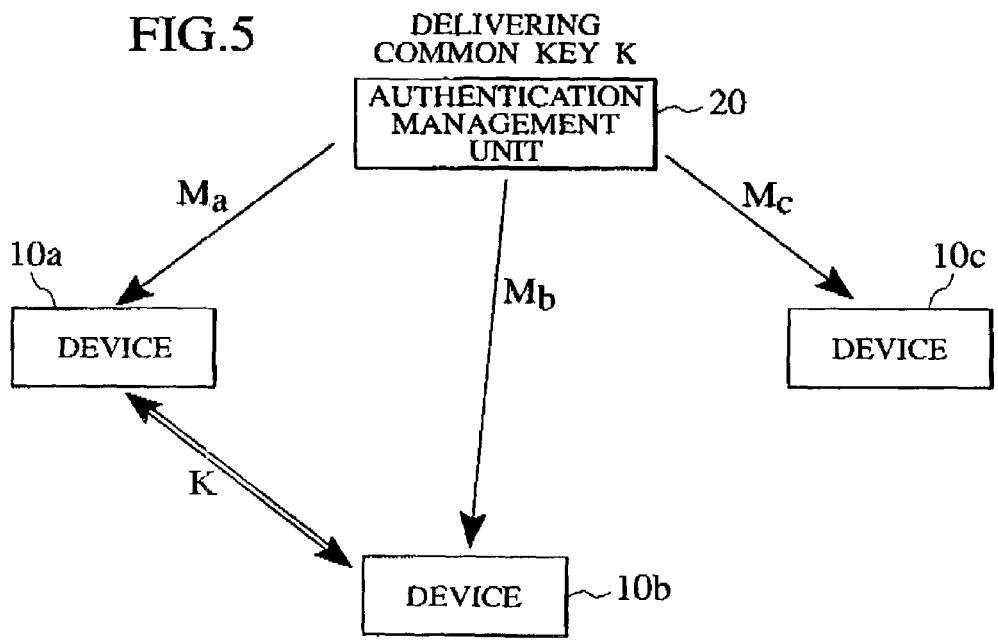

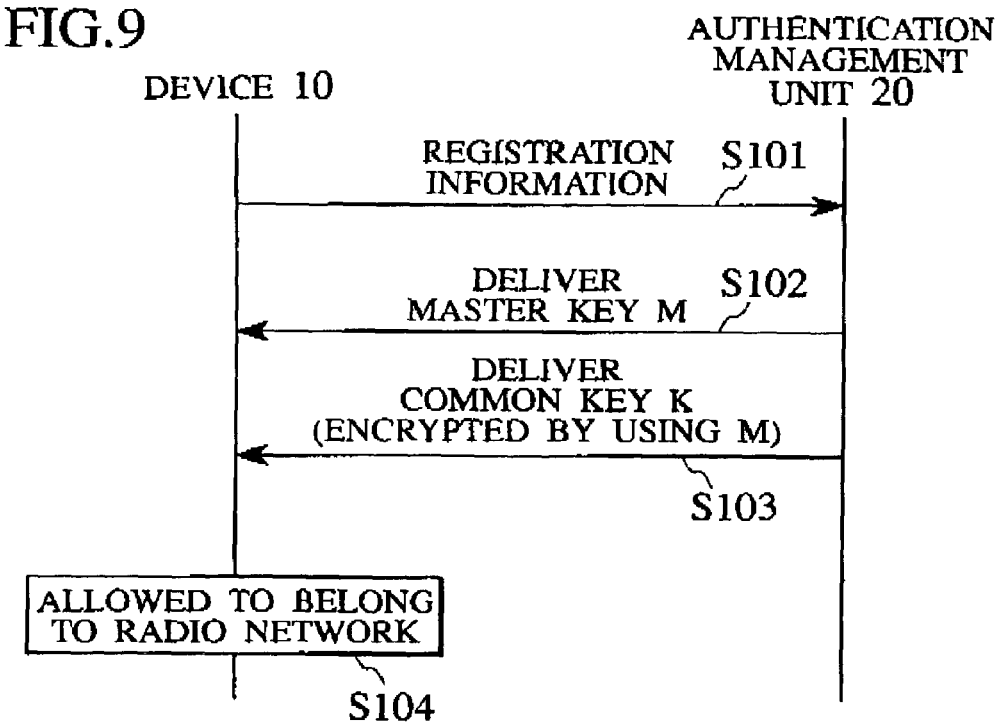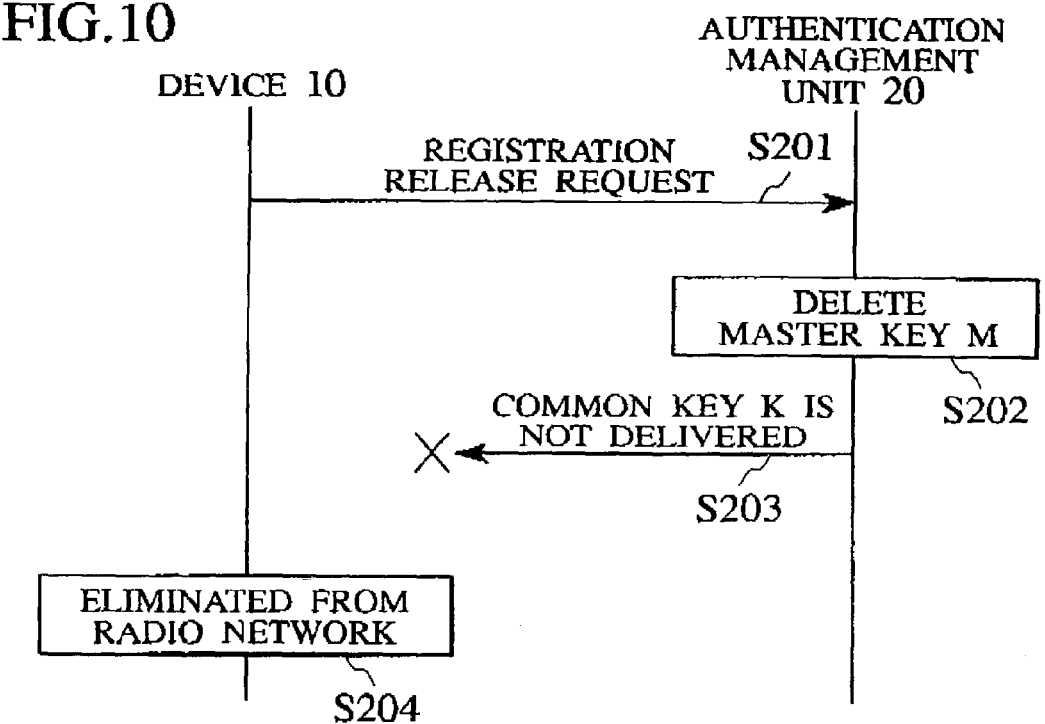

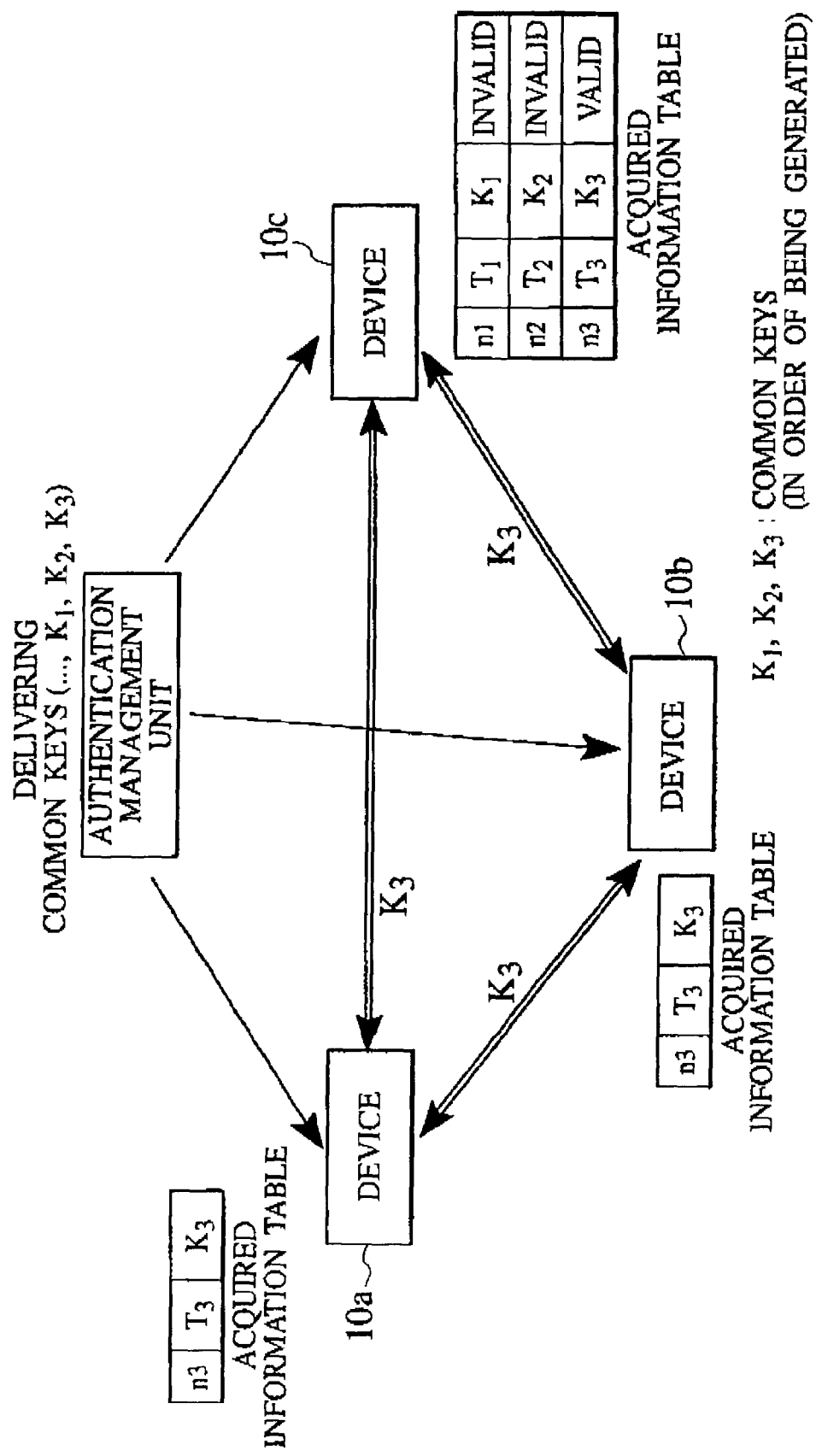

DEVICE AUTHENTICATION MANAGEMENT SYSTEM

BACKGROUND OF THE INVENTION

1. Field of the Invention

The present invention relates to a device authentication management system for carrying out authentication such that a device that acquired a prescribed secret information from an authentication management unit that manages the secret information can carry out communications with another device by using the acquired secret information.

2. Description of the Related Art

In recent years, in conjunction with the advance of the LAN (Local Area Network) technique, the networking in the office environment has been developed mainly in forms of connections among PCs (Personal Computers). While such wired LANs are spreading, the use of the wireless LAN in which a part of the wired LAN is replaced by radio is also in progress. For example, according to this use of the wireless LAN, a radio base station is connected to the wired LAN and a plurality of portable PCs are connected to this base station by radio.

Then, the portable PC can make the communication connection with a PC connected to the wired LAN by Ethernet by radio, and edit a file of that PC with respect to which the communication connection is made. In this way, the portable PC can effectively make the radio access to the wired LAN.

Also, the portions between the base station and the portable PC are effectively forming a wireless LAN. The advantages of such a wireless LAN are that there is no need to lay cables because radio waves or infrared rays are used as transmission paths, and that a new construction or a layout change of the network is easy.

The introduction of such a wireless LAN is becoming popular due to the standardization of IEEE 802.11. In IEEE 802.11, the 2.4 GHz band wireless LAN specification was completed in 1997, and the 5 GHz band wireless LAN specification was completed in 1999. The transmission rate of the 2.4 GHz band wireless LAN specification is either 1 to 2 Mbps or 11 Mbps, and the specification with the transmission rate over 20 Mbps is currently under the discussion. Recently, products compatible with this 2.4 GHz band specification have been released by many companies so that the base station and the radio PC card are now priced in an affordable range of general users.

On the other hand, the 5 GHz band wireless LAN specification can realize the transmission rate of 20 to 30 Mbps. Also, unlike the 2.4 GHz band, 5 GHz band is currently almost unused frequency band in which faster transmission rates can be expected easily, so that it has a prospect of becoming the next generation wireless LAN specification. With the appearance of some venture company that plans to sell one chip with 5 GHz band communication function at $35 in 2001, communications in the 5 GHz band are now becoming familiar.

In addition, there is a trend to install the communication scheme based on the Bluetooth on all kinds of devices in a variety of fields including those of portable telephones, home electronics and PCs. This communication scheme based on the Bluetooth is also a 2.4 GHz band radio system, and the radio devices using the communication scheme based on the Bluetooth are expected to spread worldwide due to the facts that a chip adopting the communication scheme based on the Bluetooth requires a low cost of about $5 for one chip, the communication scheme based on the Bluetooth are accepted by approximately 2000 companies in a variety of fields, and there has been the standardization activity for the radio device using the communication scheme based on the Bluetooth that has been made in direct connection with the product developments.

From the circumstances described above, as radio devices are spread, the range of application of these techniques is expected to cover not just the office environment but also the general homes as well. In particular, the fact that there is no need to lay cables in the home is even greater advantage than the case of the office environment.

However, despite of the fact that the operation by radio is easy, the feature of the connection among the radio devices that it does not use an explicit connection such as that used in the case of the cable connection or the like tends to give rise to the problem of security and privacy. There is a possibility for having the radio device controlled from outside the home without consent, a possibility for having the personal information stolen from the radio device, or a possibility for data in the radio device to get destroyed.

Also, the internet connection is now shifting frog a part time basis to a full time basis, but when it becomes popular to make the full time connection through a radio network interface as a result, there is also a possibility for allowing a third person to intrude into the PC via the radio network interface by evading the firewall.

Also, the general home users are likely to experience some vague anxiety because of the circumstances in which the home users can learn some knowledge about the presence of threats related to the security such as eavesdropping and pretending, through news related to the computer virus from the PC industry or TV programs.

Under the business environment, it is relatively easy to take measures against these threats by hiring a specialist, and it is possible to implement the IPSEC or firewall and continually updating such software. However, under the home environment, it is expected to be rather difficult for many users to take such measures in general. For this reason, in the case of using the radio device at the home, there is a need for the sufficient security management in order to prevent the eavesdropping from the external or the like.

For this security management at the home, first an authentication management unit for comprehensively managing the security of each device is installed. Then, in order for the authentication management unit to manage the security of each device, each device for which the security management is desired makes a registration to the authentication management unit. Each device that made the registration to the authentication management unit as the security management is desired forms a radio network with the authentication management unit, and placed under the security management of the authentication management unit only during a prescribed valid period such that the eavesdropping from a third party device can be prevented.

Here, the valid period is a period for which the device can use the authentication information given from the authentication management unit, and there is a need for the device to carry out the updating of the valid period with respect to the authentication management unit regularly in order to update the valid period of the authentication information. The reasons for setting up the valid period for the authentication information in this way include that there is a need to prevent the device from being connected to the home radio network indefinitely, and that it becomes possible to reduce the danger of having the device connected to the home radio network unexpectedly even when this device is handed over to someone else or discarded because the valid period of the security management expires at some point.

More specifically, as shown in FIG. 25, an authentication management unit A carries out the security management for a device 10b and a device 10c, and an authentication management unit B carries out the security management of a device 10d and a device 10e. On the other hand, the authentication management unit A does not carry out the security management of a device 10a outside of the home and a device 10d of a neighboring home, and the authentication management unit B does not carry out the security management of a device 10f outside of the home. The device 10b and the device 10c of the A's home can carry out communications under the security management of the authentication management unit A by carrying out communications by using the authentication information given from the authentication management unit A. Also, the authentication management unit A (or B) can carry out the security management of specific devices 10b and 10c (or 10d and 10e) within a range of a radio network (indicated by a dashed line in FIG. 25) formed by the authentication management A (or B).

However, the end time of the valid period for which the security management can be carried out is managed by each device existing in a range for which the radio network is formed, but when a plurality of devices exist in a range of the radio network, they may not have the same end time. The reasons why the end times of the valid periods are not the same among the devices in general are that there can be cases where one device among the two devices attempts to update the new valid period earlier than the other device, and that there can be cases where times indicated by the timers provided in the devices may not be exactly the same.

Also, in the case where each device judges the valid period according to the time indicated by the timer provided in the own device, even if the time indicated by the timer is accurate at one point, it is inevitable for the timer to become fast or slow in future due to the structures of the CPU or the like provided inside the own device. For this reason, even if the start times of the valid periods of the secret keys are the same among the devices, there can be cases where the valid periods of the secret keys of the devices do not end at the same time in future.

Moreover, each device used at the home may not necessarily have its power turned on all the times, so that when the power of each device is not turned on, the update of the authentication information cannot be made until the power is turned on next time. In this case, the device which could not have updated the authentication information will have a delay until the power is turned on and the update of the authentication information is made, so that this device may have the authentication information different from the other devices during that period of time.

Consequently, even if the device has the secret key that is common to those of the other devices at a current timing, there can be cases where the secret key becomes not common to those of the other devices in future as described above, and there is a possibility for that device to become impossible to carry out communications with the other devices by using the secret key provided in the own device.

When there is a difference in the end times of the valid periods of the devices as described above, each device may encounter the problems such as the communications with the other devices cannot be started, or the communications carried out with the other device are interrupted in a middle. For example, the devices using the radio scheme based on the Bluetooth are carrying out point-to-point (device-to-device) communications so that the communications will be interrupted if the timings for updating the authentication information among these devices are not aligned. Also, for the devices using the broadcast type radio scheme such as IEEE 802.11 wireless LAN, it is difficult to identify the number of devices participating in the communications, but unless all these devices have the same authentication information, there is a possibility for having the communications interrupted partially.

BRIEF SUMMARY OF THE INVENTION

It is therefore an object of the present invention to provide a device authentication management system capable of preventing a situation in which it becomes impossible for each device to start the communications with the other devices when there is a difference in the end times of the valid periods of the secret keys provided in the devices.

According to one aspect of the present invention there is provided a device authentication management system, comprising: an authentication management unit configured to manage a prescribed secret information; and a device configured to acquire the prescribed secret information from the authentication management unit and carry out an authentication in order to carry out communications with another device by using the prescribed secret information; wherein the authentication management unit has: a generation unit configured to generate the prescribed secret information that contains a first authentication information for carrying out communications between the authentication management unit and the device, and a second authentication information for carrying out communications between the device and the another device; a first authentication unit configured to carry out the authentication in order to carry out communications with the device, by using the first authentication information generated by the generation unit; and a first communication unit configured to transmit the second authentication information according to the authentication by the first authentication unit; and the device has: a second authentication unit configured to carry out the authentication in order to carry out communications with the first authentication unit by using the first authentication information acquired in advance from the authentication management unit; and a second communication unit configured to receive the second authentication information from the first communication unit according to the authentication by the second authentication unit.

According to another aspect of the present invention there is provided an authentication management device for use in a device authentication management system in which a device acquires a prescribed secret information from the authentication management device and carries out an authentication in order to carry out communications with another device by using the prescribed secret information, the authentication management device comprising: a generation unit configured to generate the prescribed secret information that contains a first authentication information for carrying out communications between the authentication management device and the device, and a second authentication information for carrying out communications between the device and the another device; an authentication unit configured to carry out the authentication in order to carry out communications with the device, by using the first authentication information generated by the generation unit; and a communication unit configured to transmit the second authentication information according to the authentication by the authentication unit.

According to another aspect of the present invention there is provided a device for use in a device authentication management system in which the device acquires a prescribed secret information from an authentication management device and carries out an authentication in order to carry out communications with another device by using the prescribed secret information, the device comprising: an authentication unit configured to carry out the authentication in order to carry out communications with the authentication management device by using the first authentication information acquired in advance from the authentication management device; and a communication unit configured to receive the second authentication information from the authentication management device according to the authentication by the authentication unit.

According to another aspect of the present invention there is provided a device authentication management method in which a device acquires a prescribed secret information from an authentication management unit and carries out an authentication in order to carry out communications with another device by using the prescribed secret information, the device authentication management method comprising: (a) generating the prescribed secret information that contains a first authentication information for carrying out communications between the authentication management unit and the device, and a second authentication information for carrying out communications between the device and the another device, at the authentication management unit; (b) carrying out the authentication in order to carry out communications with the device, by using the first authentication information generated by the step (b), at the authentication management unit; (c) transmitting the second authentication information according to the authentication by the step (b); (d) carrying out the authentication in order to carry out communications with the authentication management unit by using the first authentication information acquired in advance from the authentication management unit, at the device; and (e) receiving the second authentication information from the authentication management unit according to the authentication by the step (d), at the device.

Other features and advantages of the present invention will become apparent from the following description taken in conjunction with the accompanying drawings.

BRIEF DESCRIPTION OF THE DRAWINGS

FIG. 4 is a diagram showing a first part of a procedure for a device to acquire a common key from an authentication management unit in the first embodiment of the present invention.

FIG. 5 is a diagram showing a second part of a procedure for a device to acquire a common key from an authentication management unit in the first embodiment of the present invention.

FIG. 9 is a sequence chart showing a procedure for a device to acquire a common key from an authentication management unit in the first embodiment of the present invention.

FIG. 10 is a sequence chart showing a procedure for an authentication management unit to delete a registration information of a device in the first embodiment of the present invention.

FIG. 11 is a diagram showing a procedure by which a device carries out an authentication with another device by using one of a plurality of common keys in the first embodiment of the present invention.

DETAILED DESCRIPTION OF THE INVENTION

[First Embodiment]

Referring now to FIG. 1 to FIG. 18, the first embodiment of a device authentication management system according to the present invention will be described in detail.

(Configuration of the Device Authentication Management System)

Figure 2:
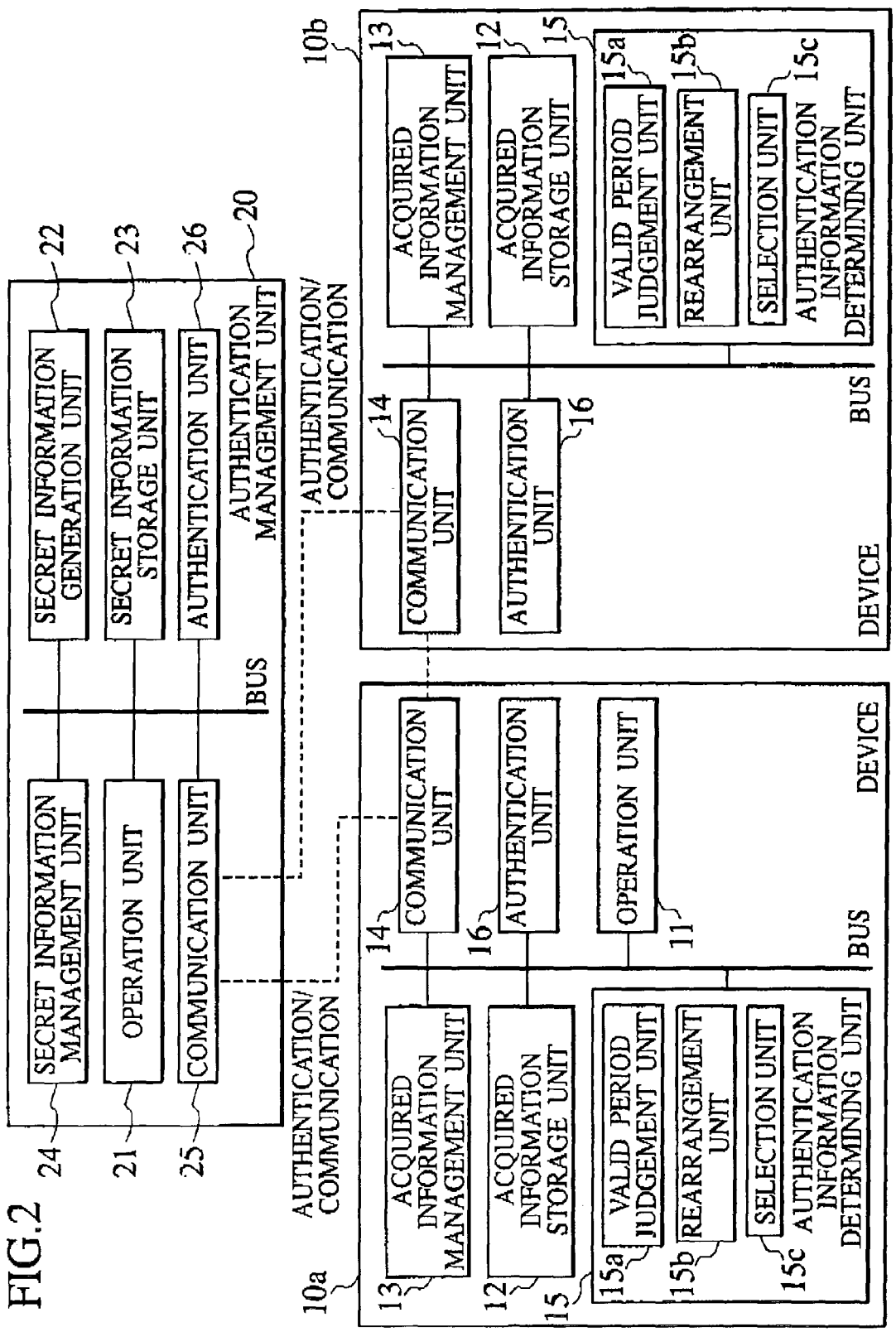
FIG. 2 is a block diagram showing an internal configuration of the device authentication management system according to the first embodiment of the present invention.

FIG. 2 shows an internal configuration of a device authentication management system according to this embodiment. As shown in FIG. 2, in this device authentication management system, a device 10a that has acquired a secret information from an authentication management unit 20 for managing a prescribed secret information carries out the authentication in order to carry out communications with another device 10b by using the acquired secret information.

Here, the authentication management unit 20 has a secret information generation unit 22 for generating the secret information comprising a first authentication information to be used for carrying out communications between the authentication management unit 20 and the device 10 and a second secret information to be used for carrying out communications between the device 10 and the other device 10, an authentication unit 26 for carrying out the authentication in order to carry out communications with the device 10 by using the first authentication information generated by the secret information generation unit 22, and a communication unit 25 for transmitting the second authentication information according to the authentication by the authentication unit 26.

Also, the device 10 has an authentication unit 16 for carrying out the authentication in order to carry out communications with the authentication unit 26 by using the first authentication information that is acquired in advance from the authentication management unit 20, and a communication unit 14 for receiving the second authentication information from the communication unit 25 according to the authentication by the authentication unit 16.

Figure 1:
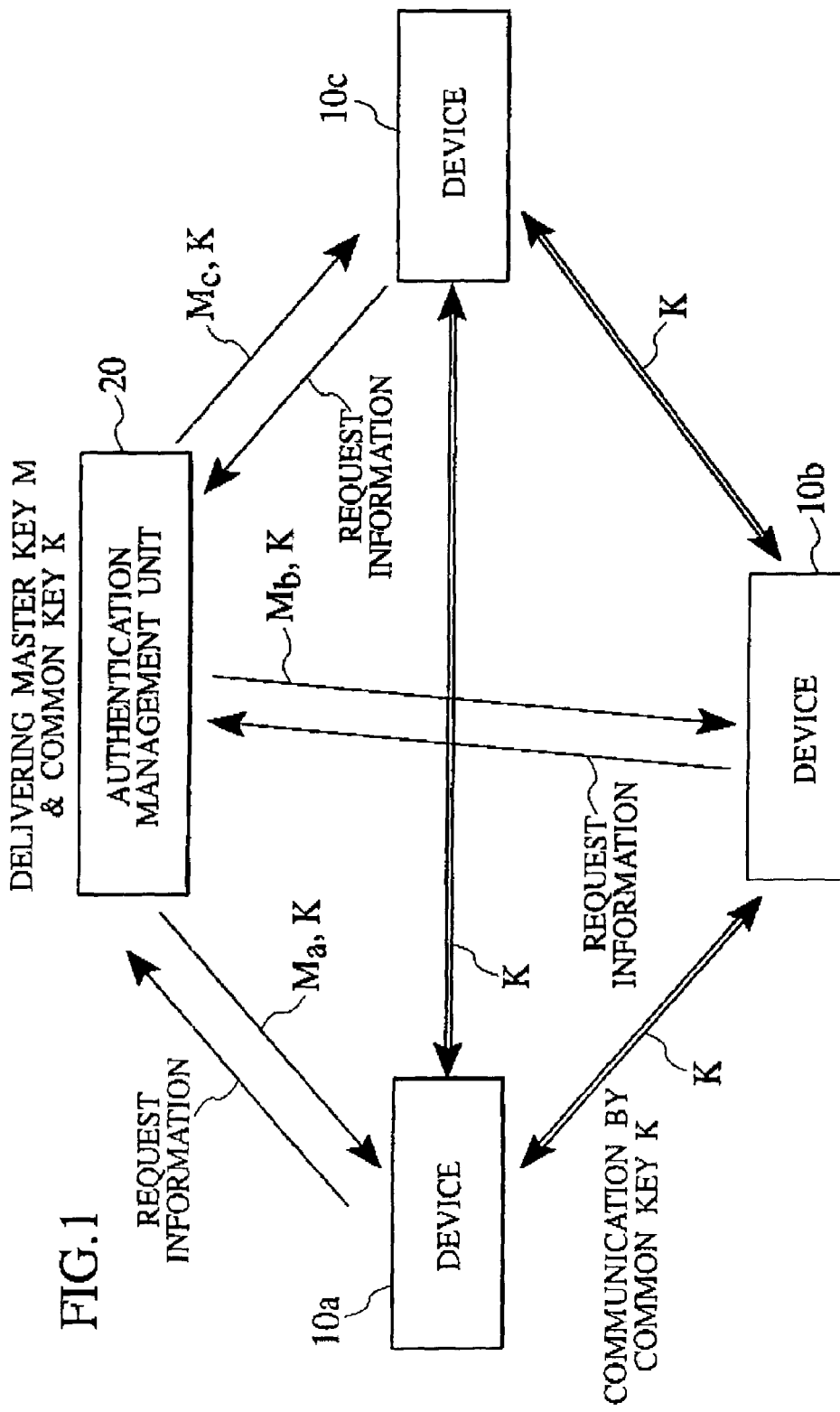
FIG. 1 is a schematic diagram showing an exemplary configuration of a device authentication management system according to the first embodiment of the present invention.

Namely, in this device authentication management system, as shown in FIG. 1, the devices 10a to 10c that have acquired master keys Ma to Mc from the authentication management unit 20 acquire a common key K that is common to the devices 10a to 10c from the authentication management unit 20 by using the acquired master keys Ma to Mc, and the devices 10a to 10c that have acquired that common key K carry out the authentication among the devices 10a to 10e for which the information data transmission and reception are desired, by using the acquired common key K. When the authentication using this common key K succeeds, each of the devices 10a to 10c can carry out the information data transmission and reception with the other device for which the authentication has succeeded.

The above described master key M is the first authentication information (encryption key) to be used for carrying out the communications between the authentication management unit 20 and the device 10. Also, the common key K is a part of the second authentication information (authentication information), which is an encryption key to be used for carrying out communications between the device 10 and the other device 10.

Also, the authentication information is the second authentication information to be used for carrying out communications between the device and the other device 10, which contains the common key (encryption key) K to be used for carrying out the common encrypted authentication between the devices 10, an identifier for identifying the authentication information, and a valid period information indicating the valid period of the authentication information, for example. In addition, the secret information is information including the first authentication information and the second authentication information.

As shown in FIG. 2, the device authentication management system according to this embodiment has devices 10 and the authentication management unit 20.

The device 10 acquires the prescribed secret information from the authentication management unit 20, and carries out the authentication in order to carry out the communications with the other device 10 by using that acquired secret information, and has an operation unit 11, an acquired information storage unit 12, an acquired information management unit 13, a communication unit 14, an authentication information determining unit 15 and an authentication unit 16, in this embodiment.

The operation unit 11 makes input of information data or the like, and can be in a form of a keyboard, for example. Note that the shape of the operation unit 11 can be button-like shape or joystick-like shape. More specifically, when a detection signal for registering information of the device 10 to the authentication management unit 20 is detected, the operation unit 11 outputs the detected detection signal to the acquired information management unit 13.

Also, when an authentication command signal for carrying out the authentication with the authentication management unit 20 entered by the user operation is detected, the operation unit 11 outputs the detected authentication command signal to the acquired information management unit 13. In addition, when a device authentication command signal for carrying out the authentication with each device 10 is entered by the user operation, the operation unit 11 acquires the entered device authentication command signal to the acquired information management unit 13.

The acquired information storage unit 12 stores a plurality of the first authentication information (master key M) and the second authentication information (authentication information), and can be in a form of a hard disk or an IC chip, for example. More specifically, the acquired information storage unit 12 stores the master key M or the authentication information acquired by the acquired information management unit 13 from the communication unit. Note that the acquired information storage unit 12 can also store information data such as characters, facial pictures, etc., to be transmitted to the other device 10.

The acquired information management unit 13 controls the internal operation of the device 10, and can be in a form of a CPU, for example. More specifically, when the detection signal is entered from the operation unit 11, the acquired information management unit 13 produces a registration information corresponding to the detection signal according to the entered detection signal. Then, after producing the registration information, the acquired information management unit 13 outputs the produced registration information as a request signal to the communication unit 14.

Here, the registration information can contain a name of the device 10, a picture of a user who owns the device 10, a name of the manufacturer who manufactured and sold the device 10, a serial number of the device 10, the date on which the user purchased the device 10, PIN (Personal Identification Number), etc., for example. By registering the registration information of the device 10 to the authentication management unit 20, the device 10 can acquire the master key M from the authentication management unit 20 (as will be described below).

When the request signal from the communication unit 14 is received, the authentication management unit 20 makes the registration according to the received request signal such that the device 10 which transmitted that request signal belongs to the radio network of the authentication management unit 20, and distributes the master key M to the device 10 that made the registration. When the master key M transmitted from the authentication management unit 20 is received at the communication unit 14, the acquired information management unit 13 stores the received master key K into the acquired information storage unit 12.

Also, when the authentication command signal is entered from the operation unit 11, the acquired information management unit 13 transmits the entered authentication command signal to the communication unit 14, acquires the master key M corresponding to the entered authentication command signal, and outputs the acquired master key M to the authentication unit 16. When the authentication command signal is entered from the acquired information management unit 13, the communication unit 14 transmits the entered authentication command signal to the communication unit 25.

When the master key M corresponding to the authentication command signal is entered from the acquired information management unit 13, the authentication unit 16 decrypts the common key K that is encrypted by using the master key M transmitted from the communication unit 25 of the authentication management unit 20, by using the entered master key M, and outputs the decrypted common key K to the acquired information management unit 13.

When the decrypted common key K is entered from the authentication unit 16, the acquired information management unit 13 stores the entered common key K into the acquired information storage unit 12. In addition, when the device authentication command signal is entered from the operation unit 11, the acquired information management unit 13 outputs the entered device authentication command signal to the authentication information determining unit 15.

The authentication information determining unit 15 selects the second authentication information in order to carry out communications with the other device 10, and has a valid period judgement unit 15a, a rearrangement unit 15b, and a selection unit 15c in this embodiment.

The valid period judgement unit 15a checks the valid period information contained in the second authentication information (authentication information). More specifically, when the device authentication command signal is entered from the acquired information management unit 13, the valid period judgement unit 15a acquires the common key K stored in the acquired information storage unit 12, judges the valid period (expiration time) of the common key K from the valid period information contained in that common key K, and outputs a judgement signal indicating that the valid period is judged, to the acquired information management unit 13 and the rearrangement unit 15b.

The rearrangement unit 15b rearranges a plurality of the second authentication information corresponding to the valid period information into a prescribed order, according to the valid period information contained in the second authentication information. More specifically, when the judgement signal from the valid period judgement unit 15a is entered, the rearrangement unit 15b rearranges a plurality of the authentication information stored in the acquired information storage unit 12 into a descending order of the valid periods, for example, according to the entered judgement signal, and outputs a rearrangement result signal indicating the rearranged result to the selection unit 15c.

The selection unit 15c selects one second authentication information corresponding to the valid period information from a plurality of the second authentication information containing the valid period information which are stored in the acquired information storage unit 12, according to the valid period information contained in the second authentication information. More specifically, when the rearrangement result signal is entered from the rearrangement unit 15b, the selection unit 15c judges which authentication information among the rearranged authentication information should be used according to the entered rearrangement result signal, and outputs the judged result as a use judgement signal to the acquired information management unit 13.

For example, when the rearrangement result signal is entered, the selection unit 15c selects the authentication information for which the expiration time of the valid period is longest among the authentication information rearranged in the order of the valid periods, according to the entered rearrangement result signal, and judges to use it for the authentication with each device 10.

Also, the selection unit 15c acquires the identifiers contained in a plurality of the second authentication information (common key K) available at the other device 10b, extracts the common identifiers among the acquired identifiers and the identifiers contained in a plurality of the second authentication information available at the device 10a, and selects one second authentication information corresponding to the valid period information among the second authentication information corresponding to the extracted identifiers, according to the valid period information corresponding to these identifiers.

More specifically, first, when the operation unit 11 (of the device 10a) detects the device authentication command signal for carrying out the authentication with the device 10b entered by the user operation, the operation unit 11 outputs the detected device authentication command signal to the acquired information management unit 13.

When the device authentication command signal is entered from the operation unit 11, the acquired information management unit 13 outputs the entered device authentication command signal to the selection unit 15c if it is judged that the entered device authentication command signal is a signal for which the authentication information should be selected according to the identifier contained in the authentication information. Note that, if the entered device authentication command signal a signal for which the authentication information should be selected according to the valid period information contained in the authentication information, the acquired information management unit 13 outputs the entered device authentication command signal to the above described valid period judgement unit 15a.

When the device authentication command signal is entered from the acquired information management unit 13, the selection unit 15c acquires the identifiers (n-3, n-2, n-1, n) of the authentication information corresponding to the device authentication command signal from the acquired information storage unit 13, for example, according to the entered device authentication command signal, and outputs the acquired identifiers (n-3, n-2, n-1, n) to the communication unit 14.

When the identifiers (n-3, n-2, n-1, n) are entered from the selection unit 15c, the communication unit 14 transmits the entered identifiers (n-3, n-2, n-1, n) to the communication unit 14 of the device 10b. On the other hand, the device 10b transmits the identifiers (n-3, n-2, n-1) stored in he acquired information storage unit 12 of the device 10b, for example, to the device 10a that have transmitted the identifiers (n-3, n-2, n-1, n) similarly as in the above described procedure.

When the identifiers (n-3, n-2, n-1) are received from the device 10b, the communication unit 14 of the device 10a outputs the received identifiers (n-3, n-2, n-1) to the selection unit 15c. Then, when the identifiers (n-3, n-2, n-1) are entered from the communication unit 14, the selection unit 15c acquires the identifiers (n-3, n-2, n-1, n) of the authentication information to be used by the own device from the acquired information storage unit 12, and compares the acquired identifiers (n-3, n-2, n-1, n) with the identifiers (n-3, n-2, n-1) entered from the communication unit 14.

When these identifiers are compared, the identifiers (n-3, n-2, n-1) are coinciding, so that the selection unit 11e selects the identifier n-1 with the longest valid period T among the coinciding identifiers (n-3, n-2, n-1), for example. Also, the selection of this identifier n-1 is also carried out by the selection unit 15c of the device 10b by the similar procedure as described above.

When the identifier n-1 is selected, the selection unit 15c acquires the common key Kn-1 corresponding to the selected identifier n-1 from the acquired information storage unit 12, and outputs the acquired common key Kn-1 to the authentication unit 16. Then, when the common key Kn-1 corresponding to the identifier n-1 is entered from the selection unit 15c, the authentication unit 16 encrypts the information data to be transmitted to the device 10b by using the entered common key Kn-1, and the communication unit 14 transmits the information data encrypted by that common key Kn-1 to the device 10b.

Note that when a plurality of the second authentication information generated at a prescribed period by the secret information generation unit 22 are acquired, and the number of the acquired second authentication information exceeds a prescribed number, the selection unit 15c may delete any of the plurality of the acquired second authentication information. In this way, there is no need for the device to manage the valid period of the second authentication information and there is no need to provide a time management unit (not shown) for the purpose of managing the valid period.

Figure 3:
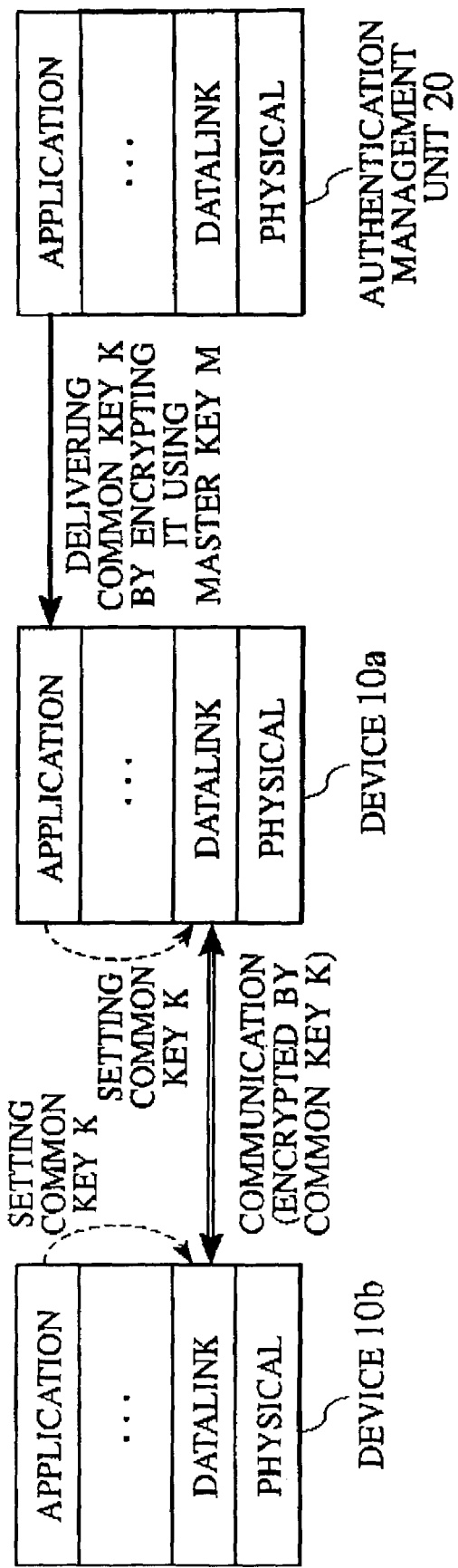
FIG. 3 is a diagram showing an OSI structure of an authentication unit in the first embodiment of the present invention.

The authentication unit 16 carries out the authentication in order to carry out communications with the authentication unit 26 by using the first authentication information (master key M) that is acquired in advance from the authentication management unit 20. More specifically, the authentication to be carried out at the authentication unit 16 can be explained by using the OSI network model as shown in FIG. 3. According to FIG. 3, the common key K common between the device 10a and the device 10b is encrypted by using the master key M at the application layer of the OSI model at the authentication management unit 20 first. Note that the common key K is generated by the secret information generation unit 22 (as will be described in detail below).

When the common Key K encrypted by using the master key M is acquired (at the communication unit 14), the device 10a decrypts the common key K encrypted by using the master key M at the application layer of the OSI model at the authentication unit 16 of the device 10a, by using the master key M entered from the acquired information management unit 13. When the common key K is decrypted, the authentication unit 16 outputs the decrypted common key K to the acquired information management unit 13, and when the common key K is entered from the authentication unit 16, the acquired information management unit 13 stores the entered common key K into the acquired information storage unit 12.

Also, the authentication unit 16 carries out the authentication in order to carry out communications with the other device 10b by using the second authentication information (common key K) received at the communication unit 14. More specifically, in the case of carrying out the authentication in order to carry out communications between the device 10a and the device 10b, the authentication unit 16 acquires the common key K common to the device 10a and the device 10b from the selection unit 15c. When the common key K is acquired, the authentication unit 16 encrypts information data (character data, image data, etc., for example) to be transmitted to the device 10b at the datalink layer of the OSI model, by using the acquired common key K.

When the information data are encrypted by using the common key K, the authentication unit 16 transmits the information data encrypted by using the common key K from the communication unit 14 through the datalink layer of the OSI model. When the information data encrypted by using the common key K are acquired from the device 10a, the authentication unit 14 of the device 10b decrypts the information data encrypted by using the common key K, by using the common key K provided in advance at the device 10b.

In this way, the common key K is distributed to all the devices 10 (10a, 10b) registered at the authentication management unit 20, so that the device 10a that has the common key K can transmit information data by encrypting them by using the common key K with respect to the other device 10b that also has the common key K, and therefore the leakage of the prescribed information data to the external party can be prevented.

The communication unit 14 receives the second authentication information from the communication unit 25 of the authentication management unit 20 according to the authentication of the authentication unit 16. The communication unit 14 can be in a form of a communication device using the communication scheme based on the Bluetooth, a communication device using the communication scheme based on the IEEE 802.11 or IrDA, etc., for example.

More specifically, when the authentication command signal is entered from the acquired information management unit 13, the communication unit 14 transmits the entered authentication command signal to the communication unit 25 of the authentication management unit 20. When the common key K encrypted by using the waster key M corresponding to the authentication command signal is received from the communication unit 25, the communication unit 14 outputs the received authentication information encrypted by using the master key M to the authentication unit 16.

When the authentication information encrypted by using the master key M is entered from the communication unit 14, the authentication unit 16 decrypts the entered authentication information encrypted by using the master key M, by using the master key M entered from the acquired information management unit 13, and outputs the decrypted authentication information to the acquired information management unit 13, and when the decrypted authentication information is entered, the acquired information management unit 13 stores the entered authentication information into the acquired information storage unit 12.

Also, when the request signal is entered from the acquired information management unit 13, the communication unit 14 transmits the entered request signal to the communication unit 25 of the authentication management unit 20. In addition, when the master key M corresponding to the request signal is received from the authentication management unit 20, the communication unit 14 outputs the received master key M to the acquired information management unit 13.

When the master key M is entered from the communication unit 14, the acquired information management unit 13 stores the entered master key M into the acquired information storage unit 12. Then, when the device authentication command signal is entered from the operation unit 11, the acquired information management unit 13 acquires the master key M from the acquired information storage unit 12 according to the entered device authentication command signal, and outputs the acquired master key M to the authentication unit 16.

Also, the communication unit 14 carries out the communications with the other device 10b according to the authentication by the authentication unit 16. More specifically, when the information data encrypted by using the common key K is entered from the authentication unit 16, the communication unit 14 transmits the entered information data encrypted by using the common key K to the other device 10b.

The authentication management unit 20 manages the prescribed secret information, and as shown in FIG. 1, it has an operation unit 21, a secret information generation unit 22, a secret information storage unit 23, a secret information management unit 24, a communication unit 25 and an authentication unit 26 in this embodiment. Note that the operation unit 21 has the same internal configuration as the operation unit 11 so that the description of the operation unit 21 will be omitted here.

The secret information generation unit 22 generates the secret information comprising the first authentication information (master key M) for carrying out communications between the authentication management unit 20 and the device 10a and the second authentication information (common key K) for carrying out the communications between the device 10a and the other device 10b.

More specifically, when the request signal is entered from the communication unit 25, the secret information generation unit 21 generates the master key M corresponding to that request signal according to the entered request signal. When the master key M is generated, the secret information generation unit 21 outputs the generated master key M and the request signal (registration information) to the secret information management unit 24, while also outputting the generated master key M to the communication unit 25. When the master key M and the registration information are entered from the secret information generation unit 21, the secret information management unit 24 stores the entered master key M and registration information into the secret information storage unit 23.

Note that the authentication information (common key K) is to be generated regularly. More specifically, the secret information generation unit 22 appropriately generates the authentication information according to the time information (time) managed by the CPU (not shown), and stores the generated authentication information into the secret information storage unit 23.

Also, when the master key M is entered from the secret information generation unit 22, the communication unit 25 transmits the entered waster key M to the device 10 that has transmitted the request signal. When the master key M is received from the communication unit 25, the communication unit 14 outputs the acquired master key M to the acquired information management unit 13, and when the master key M is entered from the communication unit 14, the acquired information management unit 13 stores the entered master key M into the acquired information storage unit 12. Note that the registration to the authentication management unit 20 implies that the master key M corresponding to the registration information is stored into the secret information storage unit 23.

FIG. 4 shows a manner by which the authentication management unit 20 distributes the secret information generated by the secret information generation unit 22 to the device 10a and the device 10b. As shown in FIG. 4, the device 10a and the device 10b are registered in advance to the authentication management unit 20 (by the procedure described above), and they can decrypt the common key K encrypted by using the master key Ma and the master key Mb transmitted from the authentication management unit 20, by using the master key Ma and the master key Mb acquired from the authentication management unit 20, and use the decrypted common key K to the authentication between the device 10a and the device 10b.

Also, the device 10c is not registered at the authentication management unit 20, so that it cannot carry out the authentication with the device 10a or the device 10b. As a result, the device 10a and the device 10b share the common key K that is common to the device 10a and the device 10b so that they can form a radio network through the common key K.

As shown in FIG. 5, when the device 10c transmits the request signal for requesting the master key Mc to the authentication management unit 20 in order to acquire the common key K common to the device 10a and the device 10b, the authentication management unit 20 transmits the master key Mc corresponding to the received request signal to the device 10c.

Figure 6:
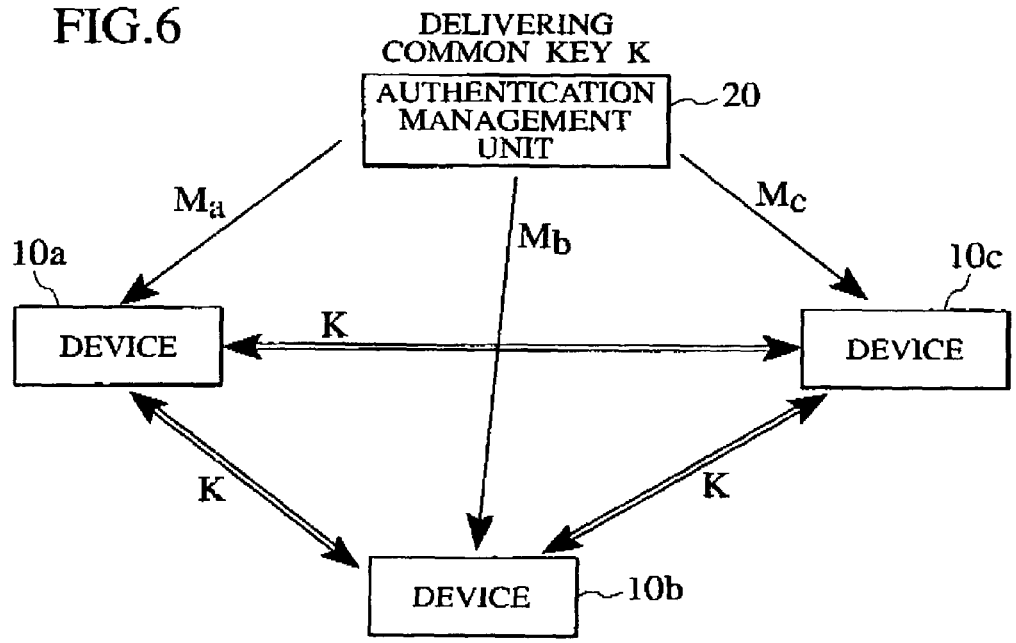
FIG. 6 is a diagram showing a third part of a procedure for a device to acquire a common key from an authentication management unit in the first embodiment of the present invention.

When the master key Mc is received from the authentication management unit 20, the device 10c receives the common key K encrypted by using the master key Mc from the authentication management unit 20, and decrypts the received common key K encrypted by using the master key Mc, by using the master key Mc acquired earlier, as shown in FIG. 6. In this way, when the common key K is decrypted, it becomes possible for the device 10c to belong to the radio network formed between the device 10a and the device 10b that have the common key K, by using the common key K available at the device 10c, as shown in FIG. 5.

Figure 7:
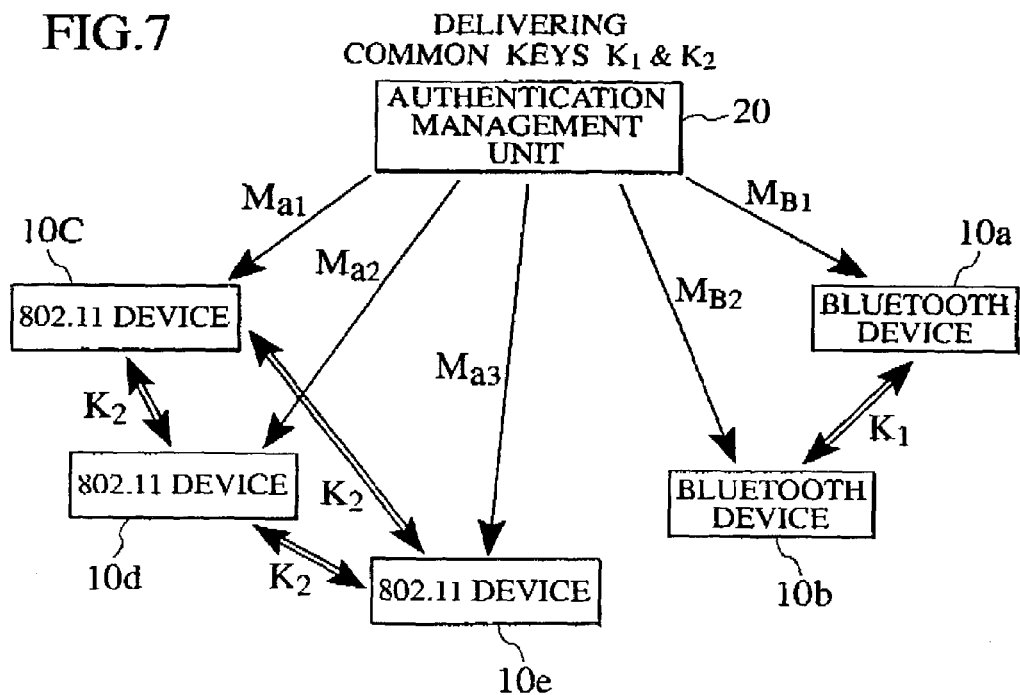
FIG. 7 is a diagram showing a case where an authentication management unit manages a plurality of devices using different communication schemes in the first embodiment of the present invention.

As shown in FIG. 7, the secret information generation unit 22 can set up a type of the master key M according to the communication scheme used at the device 10. For example, when the BT devices 10a and 10b shown in FIG. 7 are using the communication scheme based on the Bluetooth, the secret information generation unit 21 can generate the master key $M_{B\_1}$ and the master key $M_{B\_2}$ corresponding to the communication scheme based on the Bluetooth.

When the master key $M_{B\_1}$ and the master key $M_{B\_2}$ are acquired from the authentication management unit 20, the BT devices 10a and 10b decrypt the common key K1 (a key for carrying out the authentication between the devices 10 using the communication scheme based on the Bluetooth) encrypted by using the master key $M_{B\_1}$ and the master key $M_{B\_2}$ that is transmitted from the authentication management unit 20, by using the master key $M_{B\_1}$ and the Master key $M_B$ 2 that are acquired earlier, and carry out the authentication between the BT devices 10a and 10b by using the decrypted common key K1.

On the other hand, when the 802.11 devices 10c to 10e shown in FIG. 7 are using the communication scheme based on the 802.11, the secret information generation unit 22 can generate the master keys $M_{8\_1}$ to $M_{8\_3}$ corresponding to the communication scheme based on the 802.11. When the master keys $M_{8\_1}$ to $M_{8\_3}$ are acquired from the authentication management unit 20, the 802.11 devices 10c to 10e can receive the common key K2 encrypted by using the master keys $M_{8\_1}$ to $M_{8\_3}$ from the authentication management unit 20, decrypt them by using the master keys $M_{8\_1}$ to $M_{8\_3}$ acquired earlier, and carry out the authentication among the 802.11 devices 10c to 10e by using the decrypted common key K2.

In this way, the secret information generation unit 21 can generate the master key M according to the communication scheme adopted by the device 10 so that each device 10 can acquire the master key M according to the communication scheme adopted by the own device, and in addition, it becomes possible for each device 10 to form the radio network with the other device 10 that uses the same communication scheme as that adopted by the own device.

Also, by the feature described above, the authentication management unit 20 can manage a plurality of devices 10 using different communication schemes by changing the type of the master key M for each one of the devices 10 using different communication schemes, such as those of the IEEE 802.11, the Bluetooth, the HiperLAN2, etc. In addition, the device 10 that does not have a real time clock as its CPU specification is small is difficult to generate the authentication information common to the devices 10, but it becomes possible to easily form the radio network with the devices 10 by using the master key M transmitted from the authentication management unit 20.

The secret information management unit 24 controls the internal operation of the authentication management unit 20. More specifically, when the request signal is entered from the communication unit 25, the secret information management unit 24 outputs the entered request signal to the secret information generation unit 22. Note that the registration to the authentication management unit 20 implies that the master key M corresponding to the registration information is stored into the secret information storage unit 23.

Also, when the master key M generated in correspondence to the request signal or the authentication information is entered from the secret information generation unit 22, the secret information management unit 24 stores the entered master key M, authentication information and registration information into the secret information storage unit 23. In addition, when the authentication command signal is entered from the communication unit 25, the secret information management unit 24 acquires the master key M and the common key K corresponding to that authentication command signal from the secret information storage unit 23 according to the entered authentication command signal, and outputs the acquired master key M and common key K to the authentication unit 26.

The secret information storage unit 23 stores the secret information (master key M, authentication information) generated by the secret information generation unit 22, and can be in a form of a hard disk, etc., for example. More specifically, when the master key M, the authentication information and the registration information are entered from the secret information management unit 24, the secret information storage unit 23 stores the entered master key M, authentication information and registration information.

The communication unit 25 transmits the second authentication information (authentication information) according to the authentication of the authentication unit 26, and can be in a form of a communication device using the communication scheme based on the Bluetooth, a communication device using the communication scheme based the IrDA, etc., for example. More specifically, when the request signal (or authentication command signal) is received from the communication unit 14, the communication unit 25 outputs the received request signal (or authentication command signal) to the secret information management unit 24. Also, when the master key M corresponding to the request signal is entered from the secret information management unit 24, the communication unit 25 transmits the entered master key M to he communication unit 14 that has transmitted the request signal.

The authentication unit 26 carries out the authentication in order to carry out communications with the device 10, by using the first authentication information generated by the secret information generation unit 22. More specifically, when the master key M and the authentication information corresponding to the authentication command signal are entered from the secret information management unit 24, the authentication unit 26 encrypts the entered authentication information by using the master key M, and outputs the authentication information encrypted by using the master key M to the communication unit 25. When the authentication information encrypted by using the master key M is entered from the authentication unit 26, the communication unit 25 transmits the entered authentication information encrypted by using the master key M to the device 10. Note that the internal processing to be carried out by the authentication unit 26 is similar to the internal processing of the authentication unit 16 described above.

(Device Authentication Management Method Using the Device Authentication Management System)

Figure 8:
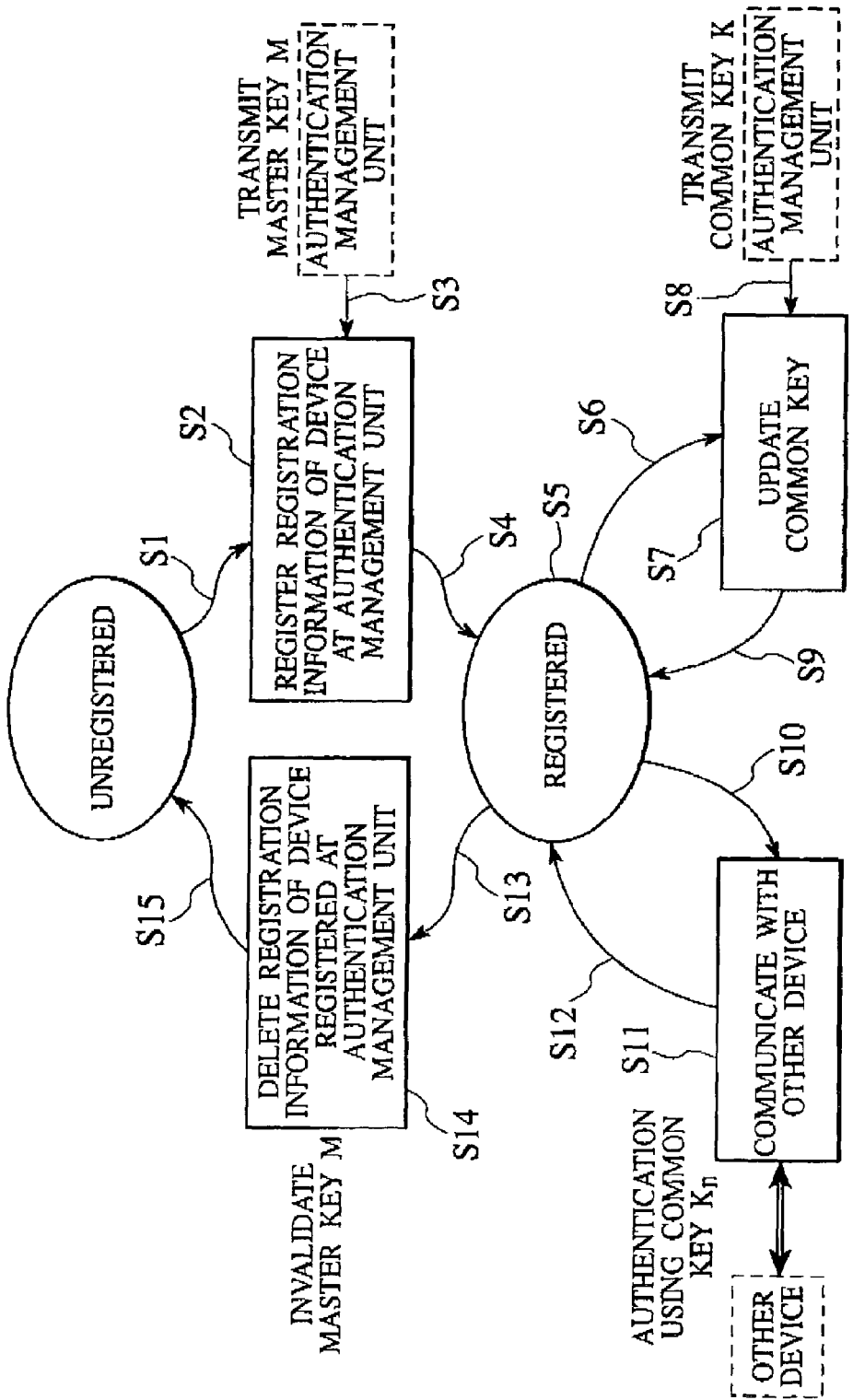
FIG. 8 is a diagram showing a state transition of a device in the first embodiment of the present invention.

The device authentication management method using the device authentication management system in the above described configuration can be executed by the following procedure. FIG. 8 shows the overall flow (state transition) of the device authentication management method according to this embodiment. Note that, in FIG. 8, portions enclosed by circles represent states of the device 10 and portions enclosed by rectangles represent processings.

As shown in FIG. 8, in the authentication management method, the device 10 that has acquired the authentication information from the authentication management unit 20 for managing the prescribed authentication information carries out the authentication in order to carry out communications with the other device 10 by using the acquired authentication information.

First, in the case where the device 10 is not registered at the authentication management unit 20, the device 10 registers the registration information of the own device to the authentication management unit 20 (S1 and S2). When the device 10 is registered at the authentication management unit 20, this registered device can acquire the master key M from the authentication management unit 20 (S3). Then, when the common key K encrypted by using the master key M is acquired from the authentication management unit 20, the device 10 decrypts the acquired common key K encrypted by using the master key M into the common key K by using the master key acquired at the step S3, so as to acquire the common key K (S5 to S8).

After that, the device 10 carries out the authentication with the other device 10 by using the decrypted common key K, and carries out the transmission and reception of the information data with the other device 10 for which the authentication succeeded (S10 to S12). Note that the deletion of the device 10 registered at the authentication management unit 20 is carried out by deleting the master key M corresponding to the registration information stored at the authentication management unit 20 (S13 to S15). The details of each procedure that constitutes the above described device authentication management method are as follows.

(1) Method by which the device 10 acquires the master key M and the common key K from the authentication management unit 20:

FIG. 9 shows a procedure by which the device 10 acquires the master key M and the common key K from the authentication management unit 20. As shown in FIG. 9, first, the device 10 carries out the step for transmitting the registration information to the authentication management unit 20 (S101). More specifically, when the detection signal is entered from the operation unit 11, the acquired information management unit 13 produces the registration information corresponding to that detection signal according to the entered detection signal.

Then, in order for the device 10 to acquire the master key M, the user operations at both the operation unit 11 and the operation unit 21 (including the input of the authentication information such as the input of PIN, for example) are necessary. When the detection signal is entered from the operation unit 11, the acquired information management unit 13 transmits the request signal (which does not contain the registration information) to the authentication management unit 20 via the communication unit 14.

On the other hand, when the detection signal is entered at the operation unit 21, the authentication management unit 20 waits until the above described request signal is transmitted from the device 10, except for the case where the above described request signal is already received. When the above described request signal is received before the detection signal is entered at the operation unit 21, the authentication management unit 20 waits until the above described request signal is transmitted from the device 10.

When the request signal is received from the device 10 (by any of the methods described above) and after the detection signal is entered at the operation unit 21, the authentication management unit 20 transmits an authentication procedure start request to the device 10, to start the authentication procedure between the authentication management unit 20 and the device 10.

The concrete contents of this authentication procedure are not defined here, but it is possible to use a method in which the device 10 transmits the PIN and the other registration information entered by the user at the operation unit 11 to the authentication management unit 20, and the authentication management unit 20 compares this PIN with the PIN entered by the user at the operation unit 21, for example. It is also possible to carry out the generation of a (temporary) key by the Diffie-Hellman key exchange method or the like between the device 10 and the authentication management unit 20 first, and then carry out the transmission of the above described PIN and other registration information by encrypting them by using this key. In addition, the transmission of the master key M to be described below can also be carried out by using the key generated here. This key will be discarded when the registration procedure (procedure of FIG. 9) is completed.

Only when the authentication procedure succeeded (the registration will not be continued when it falls for the reason such as that the PIN does not match), the subsequent generation of the master key M is carried out. Note that the user operations at both the operation unit 11 and the operation unit 21 are required here in principle, but it is also possible to use a method in which the operation at either side is omitted. For example, the PIN of the device 10 can be set to be a fixed value allocated at a time of the manufacturing, and this value can be entered into the operation unit 21. In this case, the request signal is transmitted toward the device 10 by the authentication management unit 20, rather than by the device 10.

Next, the authentication management unit 20 carries out the step for generating the master key M in order to carry out the authentication with the device 10, and transmitting the generated master key M to the corresponding device 10 (S102). More specifically, when the request signal is received from the communication unit 14, the communication unit 25 outputs the received request signal to the secret information management unit 24. Then, when the request signal is entered from the communication unit 25, the secret information management unit 24 outputs the entered request signal to the secret information generation unit 22.

After that, when the request signal is entered from the secret information management unit 24, the secret information generation unit 22 generates the master key M corresponding to that request signal according to the entered request signal. When the master key M is generated, the secret information generation unit 22 outputs the generated master key M to the secret information management unit 24, and outputs only the generated master key M to the communication unit 25. When the master key M is entered from the secret information generation unit 22, the secret information management unit 24 stores the entered master key M and registration information into the secret information storage unit 23. Note that the registration of the device 10 to the authentication management unit 20 implies that the master key M corresponding to the registration information is stored into the secret information storage unit 23.

Then, when the master key M is entered from the secret information generation unit 22, the communication unit 25 transmits the entered master key M into the communication unit 14 that has transmitted the request signal. Then, when the master key M is received from the communication unit 25, the communication unit 14 outputs the received master key M to the acquired information management unit 13, and when the master key M is entered from the communication unit 14, the acquired information management unit 13 stores the entered waster key M into the acquired information storage unit 12.

Note that the authentication management unit 20 generates the common key K regularly, and a start of the transfer is requested from the authentication management unit 20 immediately after that. There is a possibility that the device 10 cannot communicate at that point, so that it is also possible to request a start of the transfer at some timings other than that (regularly, for example).

In this way, it becomes possible for the authentication management unit 20 to omit a list management to check the device 10 to which the transfer of the common key K is done. In addition, when the valid period information is set to the common key K and it is judged that there is a possibility for the valid period of the common key K available at the device 10 to expire, a start of the transfer may be requested from the device 10 side.

Next, the device 10 carries out the step for acquiring the common key K from the authentication management unit 20 (S103). More specifically, the acquired information management unit 13 transmits the authentication command signal to the communication unit 14, acquires the master key M from the acquired information storage unit 12 and outputs the acquired master key M to the authentication unit 16. When the authentication command signal is entered from the acquired information management unit 13, the communication unit 14 transmits the entered authentication command signal to the communication unit 25.

After that, when the authentication command signal is received from the communication unit 14, the communication unit 25 outputs the received authentication command signal to the secret information management unit 24. Then, when the authentication command signal is entered from the communication unit 25, the secret information management unit 24 acquires the master key M and the authentication information corresponding to that authentication command signal from the secret information storage unit 23 according to the entered authentication command signal, and outputs the acquired master key M and authentication information to the authentication unit 26.

Then, when the master key M and the authentication information corresponding to the authentication command signal are entered from he secret information management unit 24, the authentication unit 26 encrypts the entered authentication information by using the master key M, and outputs the authentication information encrypted by using the master key M to the communication unit 25. When the authentication information encrypted by using the master key M is entered from the authentication unit 26, the communication unit 25 transmits the entered authentication information encrypted by using the master key M to the device 10, and the communication unit 14 receives the authentication information encrypted by using the master key M that is transmitted from the communication unit 25.

Next, when the master key M corresponding to the authentication command signal is entered from the acquired information management unit 13, the authentication unit 16 decrypts the common key K encrypted by using the master key M that is received at the communication unit 14, by using the entered master key M, and outputs the decrypted common key K to the acquired information management unit 13. Then, when the decrypted common key K is entered from the authentication unit 16, the acquired information management unit 13 stores the entered common key K into the acquired information storage unit 12.

Then, when the device 10 Joins the radio network formed by using the common key K, the device 10 can join the radio network formed by using the common key K by using the above described decrypted common key K for the authentication among the devices 10 (S104).

Note that, in the method for deleting the registration of the device 10 that is registered at the authentication management unit 20, as shown in FIG. 10, the device 10 carries out the step for transmitting a deletion information for deleting the registration to the authentication management unit 20 first (S201). Here, the deletion of the registration of the device 10 implies that the master key M corresponding to the registration information stored in the secret information storage unit 23 is deleted.

More specifically, when a signal for deleting the registration of the device 10 that is registered at the authentication management unit 20 which is entered by the user operation is detected, the operation unit 11 outputs the detection signal for deleting the registration of the device 10 that is registered at the authentication management unit 20, to the acquired information management unit 13. Then, when the detection signal is entered from the operation unit 11, the acquired information management unit 13 generates a registration deletion signal for deleting the registration of the device 10 that is registered at the authentication management unit 20 according to the entered detection signal, and outputs the generated registration deletion signal to the communication unit 14. After that, when the registration deletion signal is entered from the acquired information management unit 13, the communication unit 14 transmits the entered registration deletion signal to the corresponding communication unit 25.

After that, the secret information management unit 24 carries out the step for deleting the master key M (S202). More specifically, when the registration deletion signal is received from the communication unit 14, the communication unit 25 outputs the received registration deletion signal to the secret information management unit 24. In addition, when the registration deletion signal is entered from the communication unit 25, the secret information management unit 24 deletes the master key M corresponding to the registration deletion signal from the secret information storage unit 23 according to the entered registration deletion signal. Note that the master key M can also be deleted through the operation unit 21 of the authentication management unit 20.

Next, as the secret information management unit 22 deleted the master key M corresponding to the device 10, the authentication management unit 20 is operated not to transmit the common key K to the device 10 that has transmitted the registration deletion signal (S203). After that, the device 10 cannot acquire a new common key K' encrypted by using the master key M from the authentication management unit 20, so that it becomes impossible for the device 10 to belong to the radio network formed by using the common key K' as soon as the valid period of the common key K that is acquired in advance expires.

Namely, even when the device 10 acquires the common key K from the authentication management unit 20, if the valid period is set to that acquired common key K, it becomes impossible for the device 10 to belong to the radio network formed by using the common key K as soon as the valid period of that common key K expires.

(2) Method by which the device 10 selects one common key to be used at a time of the authentication with the other device according to the valid period information (valid period informations T1 to T3 corresponding to the common keys K1 to K3) contained in the authentication information among a plurality of the authentication informations (common keys K1 to K3) acquired from the authentication management unit 20:

FIG. 11 conceptually shows a procedure by which the device 10 selects one common key to be used at a time of carrying out the authentication with the other device 10 according to the valid period information contained in the authentication information among a plurality of the authentication informations stored in the acquired information storage unit 12. As shown in FIG. 11, the device 10c stores a plurality of the authentication informations in an acquired information table provided in the acquired information storage unit 12.

As a method by which the device 10c selects one of the common keys K1 to K3 to be used at a time of the authentication with the device 10a or the device 10b, there is a method in which the common key K3 with the longest valid period T3 among the authentication informations stored in the acquired information storage unit 12, for example. Note that the suffix n of Tn and Kn represents a numeral such as 1, 2, 3, and so on.

The authentication informations stored in the acquired information storage unit 12 have the valid period T3 to T1 (in a descending order of the valid periods) and the common key K3 to K1 corresponding to the identifiers n3 to n1 of the authentication informations, as shown in FIG. 11. For this reason, the selection unit 15c of the device 10c selects the common key K3 with the longest valid period when the setting to select the common key with the longest valid period among the common keys K1 to K3 stored in the acquired information storage unit 12 is made. This common key selection method is more specifically as follows.

First, when the operation unit 11 detects the device authentication command signal for carrying out the authentication with the device 10 as the user operates the operation unit 11, the operation unit 11 outputs the detected device authentication command signal to the acquired information management unit 13. Then, when the device authentication command signal is entered from the operation unit 11, the acquired information management unit 13 outputs the entered device authentication command signal to the valid period judgement unit 15a.

After that, when the device authentication command signal is entered from the acquired information management unit 13, the valid period judgement unit 15a acquires the authentication information (common keys K1 to K3) stored in the acquired information storage unit 12, judges the valid periods of the common keys K1 to K3 from the valid period informations T1 to T3 contained in the common keys K1 to K3 according to the acquired authentication information, and outputs the judgement signal indicating that the valid period is judged, to the acquired information management unit 13 and the rearrangement unit 15b.

Then, when the judgement signal is entered from the valid period judgement unit 15a, the rearrangement unit 15b rearranges a plurality of the authentication informations stored in the acquired information storage unit 12 according to the entered judgement signal, into an ascending order of the valid periods, for example, and outputs the rearrangement result signal indicating the result of the rearrangement to the selection unit 15c.

Next, when the rearrangement result signal is entered from the rearrangement unit 15b, the selection unit 11c judges to use the authentication information (common key K3) with the longest valid period among the rearranged authentication informations according to the entered rearrangement result signal, and outputs the authentication information that is judged to be used to the authentication unit 16.

Then, when the common key K3 is entered from the selection unit 15c, the authentication unit 16 carries out the authentication between the device 10a and the device 10b according to the entered common key K3 (see FIG. 11). Note that, in the procedure described above, the authentication information to be used at the device 10a (10b) is selected according to the valid period information contained in a plurality of the authentication informations (the other devices 10a and 10b have a single authentication information), but in the procedure (3) to be described below, it is also possible to select the authentication information to be used between the other devices according to the identifiers contained in the authentication information. Also, in the procedure (3) to be described below, even when the both devices have a plurality of the authentication informations, it is possible to select the authentication information that is common to the both devices.

Figure 12:
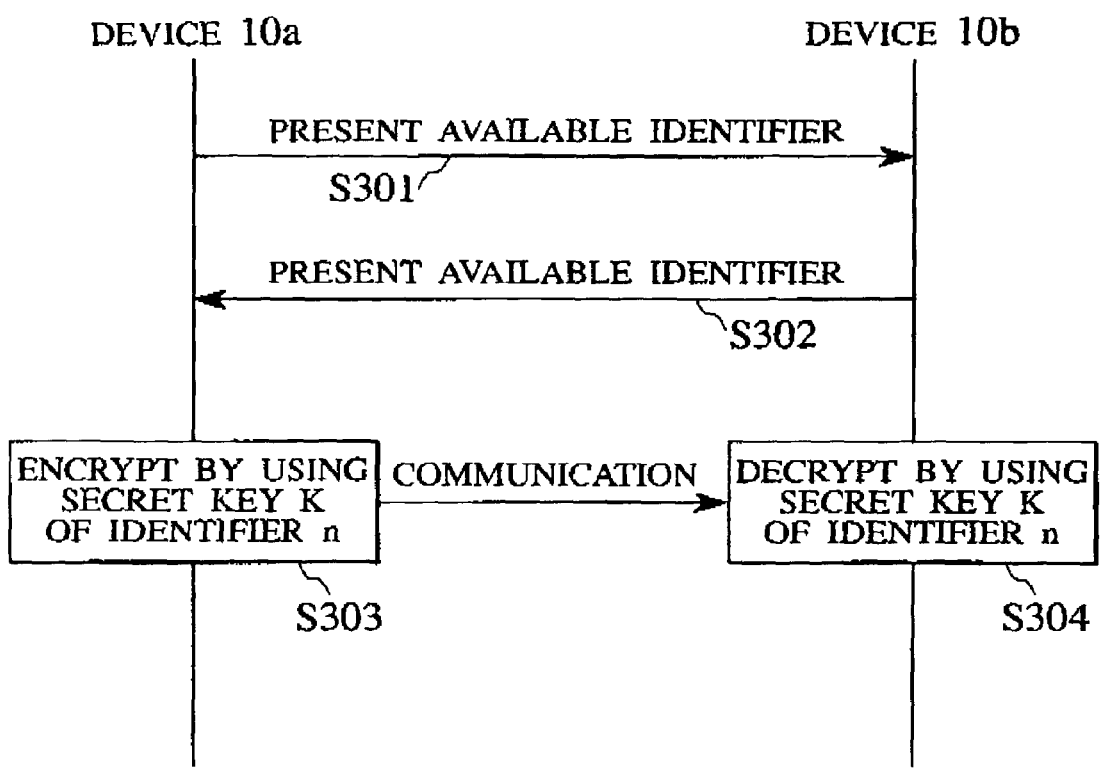
FIG. 12 is a sequence chart showing a procedure by which a device carries out the authentication with another device by using a common key in the first embodiment of the present invention.

(3) Method by which the device 10a selects the authentication information to be used with the other device 10b according to the identifiers contained in the authentication information and carries out the communications with the other device 10b by using that selected authentication information:

FIG. 12 shows a method by which the device 10a carries out transmission and reception of the information data with the other device 10b by using the common key K. As shown in FIG. 12, first, the device 10a carries out the step for transmitting the identifier n of the common key K that is available for use with respect to the other device 10b (S301). More specifically, first, when the operation unit 11 (the operation unit 11 of the device 10) detects the device authentication command signal for carrying out the authentication with the device 10b entered by the user operation, the operation unit 11 outputs the detected device authentication command signal to the acquired information management unit 13.

Then, when the device authentication command signal is entered from the operation unit 11, the acquired information management unit 13 outputs the entered device authentication command signal to the selection unit 15e, and when the device authentication command signal is entered from the acquired information management unit 13, the selection unit 15c acquires the identifier n (a part of the authentication information) corresponding to the device authentication command signal from the acquired information storage unit 12 according to the entered device authentication command signal, and outputs the acquired identifier n to the communication unit 14. After that, when the identifier n is entered from the acquired information management unit 13,the communication unit 14 transmits the entered identifier n to the communication unit 14 of the device 10b.

On the other hand, the device 10b carries out the step for transmitting the identifier nb stored in the acquired information storage unit 12 of the device 10b to the device 10a that has transmitted the identifier n, similarly as in the above procedure (S302). After that, the device 10a compares the identifier n stored in the acquired information storage unit 12 of the own device and the identifier nb received from the device 10b (the identifier of the common key Kb available at the device 10b), and when they coincide, the device 10a carries out the step for encrypting the information data to be transmitted to the device 10b by using the common key K corresponding to the identifier n (S303).

More specifically, the communication unit 14 of the device 10a acquires the identifier nb from the device 10b, and outputs the acquired identifier nb to the selection unit 15c. Then, when the identifier nb is entered from the communication unit 14, the selection unit 15c acquires the identifier n of the common key K to be used by the own device from the acquired information storage unit 12 (the method for selecting the common key K to be used is as in (2) described above), and compares the acquired identifier n with the identifier nb entered from the communication unit 14, and when they coincide as a result of the comparison, the selection unit 15c outputs the common key K corresponding to the identifier n to the authentication unit 16.

Figure 13:
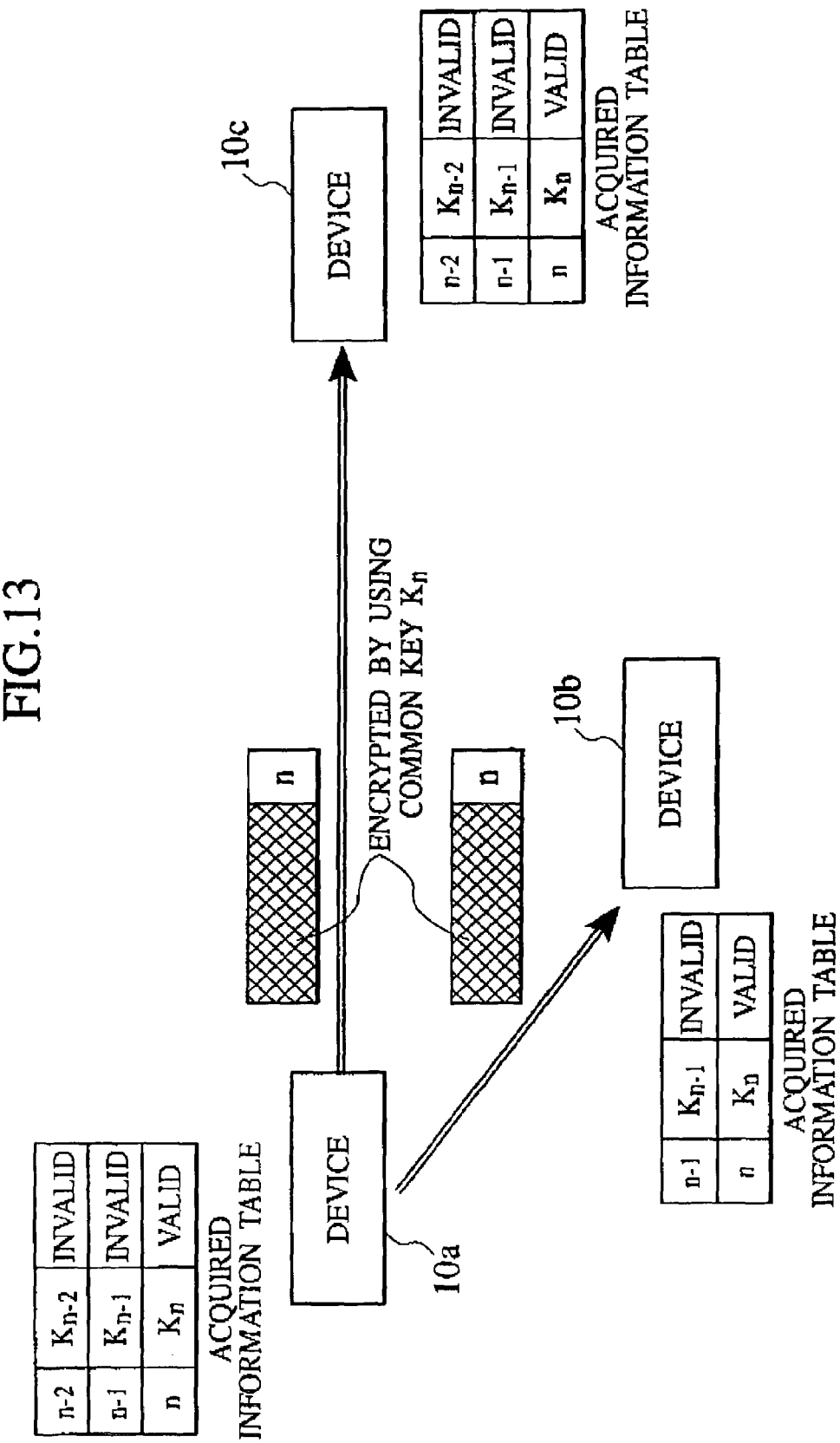
FIG. 13 is a diagram showing a case where a device carries out the authentication with a plurality of other devices in the first embodiment of the present invention.

Note that when the selection unit 15c compares the identifiers of the device 10a and the device 10b, if a plurality of the identifiers coincide as a result of the comparison, the authentication information Kn corresponding to the identifier n with the longest valid period among the authentication informations corresponding to a plurality of the coinciding identifiers (n to n-2) according to the valid period information corresponding to these identifiers (n to n-2), for example (see FIG. 13).

After that, when the common key K corresponding to the identifier n is entered from the selection unit 15c, the authentication unit 16 encrypts the information data to be transmitted to the device 10b by using the entered common key K, and transmits the information data encrypted by using the common key K to the device 10b (S303). When the information data encrypted by using the common key K is received from the device 10a, the authentication unit 16 of the device 10b decrypts the received information data encrypted by using the common key K, by using the common key Kb (which is identical to the common key K of the device 10a) corresponding to the identifier nb of the own device (S304), so as to acquire the information data transmitted from the device 10a.

In this way, the device 10a can transmit the information data available at the device 10a to the device 10b by encrypting it by using the common key K, so that the information data can be transmitted without passing through the authentication management unit 20.

Note that, when the devices 10a to 10c have a plurality of common keys Kn to Kn-2 as shown in FIG. 13, the device 10a can transmit the information data to the other devices 10b and 10c by using the common key Kn with the longest valid period by the same procedure as described above, for example. The method by which the device 10a transmits the information data to the other devices 10b and 10c (in the case of transmitting the information data to a plurality of devices) can be the same as the procedure described above. Also, the above description is directed to the procedure in the case where the authentication informations available at the both devices 10a and 10b at some point are identical.

Figure 14:
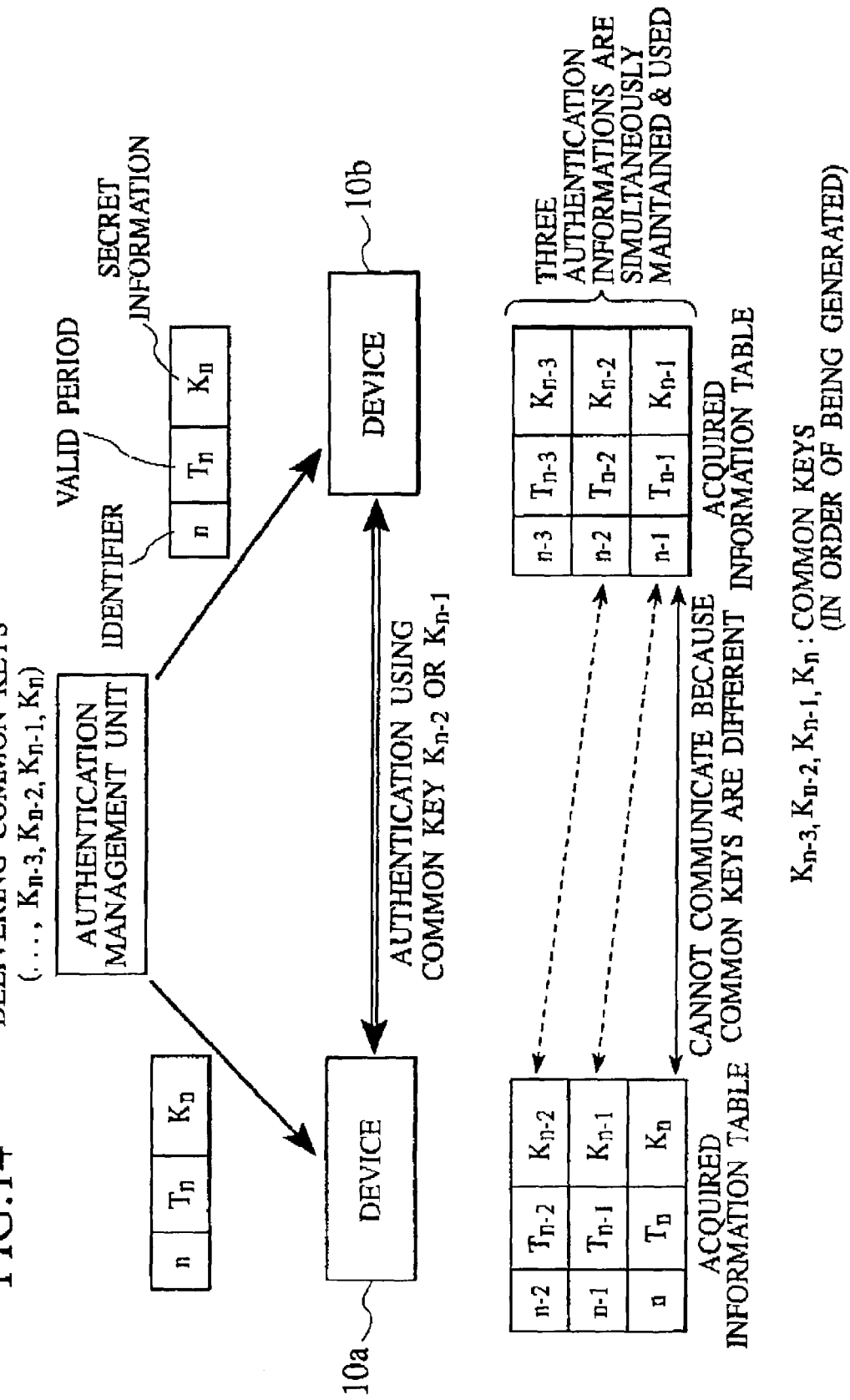
FIG. 14 is a diagram showing a case where a plurality of devices carry out the authentication by using one of a plurality of common keys in the first embodiment of the present invention.

(4) Communication method in the case where the authentication informations available at the both devices 10a and 10b at some point are not identical:

In the method of (3), the communication method in the case where the common keys K available at the devices 10 at some point are identical is described. In this (4), the communication method in the case where the common keys K available at the devices 10 at some point are not identical will be described. FIG. 14 shows an outline of the communication method in the case where the common keys K available at the device 10a and the device 10b are different at some point.

As shown in FIG. 14, when the types of the common keys K available at the device 10a and the device 10b are different at some point, it becomes impossible for the device 10a and the device 10b to carry out the transmission and reception of the information data between them. For this reason, the device 10a and the device 10b select the common key K to be used between the device 10a and the device 10b by the method to be described below, and carry out the transmission and reception of the information data between the device 10a and the device 10b by using the selected common key K.

As shown in FIG. 14, the authentication management unit 20 generates the common keys in the order of Kn-3, Kn-2, Kn-1 and Kn, and each of the device 10a and the device 10b acquires the common keys Kn-3, Kn-2, Kn-1 and Kn generated by the authentication management unit 20 and stores the acquired common keys into the acquired information storage unit 12. Here, however, it is assumed that the types of the common keys Kn to Kn-3 stored in the acquired information storage units 12 of the device 10a and the device 10b at some point are different (see FIG. 14). Also, the acquired information table shown in FIG. 14 indicates the authentication information (identifier n, valid period T, common key K, etc.) stored in the acquired information storage unit 12 in the time series order (where the time series starts from the top line). The "acquired information table" used in the following description will have the same meaning.

Then, the device 10a and the device 10b select the common key to be used between the device 10a and the device 10b among the common keys stored in the acquired information storage units 12, and carry out the transmission and reception of the information data available at the device 10a or the device 10b by using the selected common key.

Figure 15:
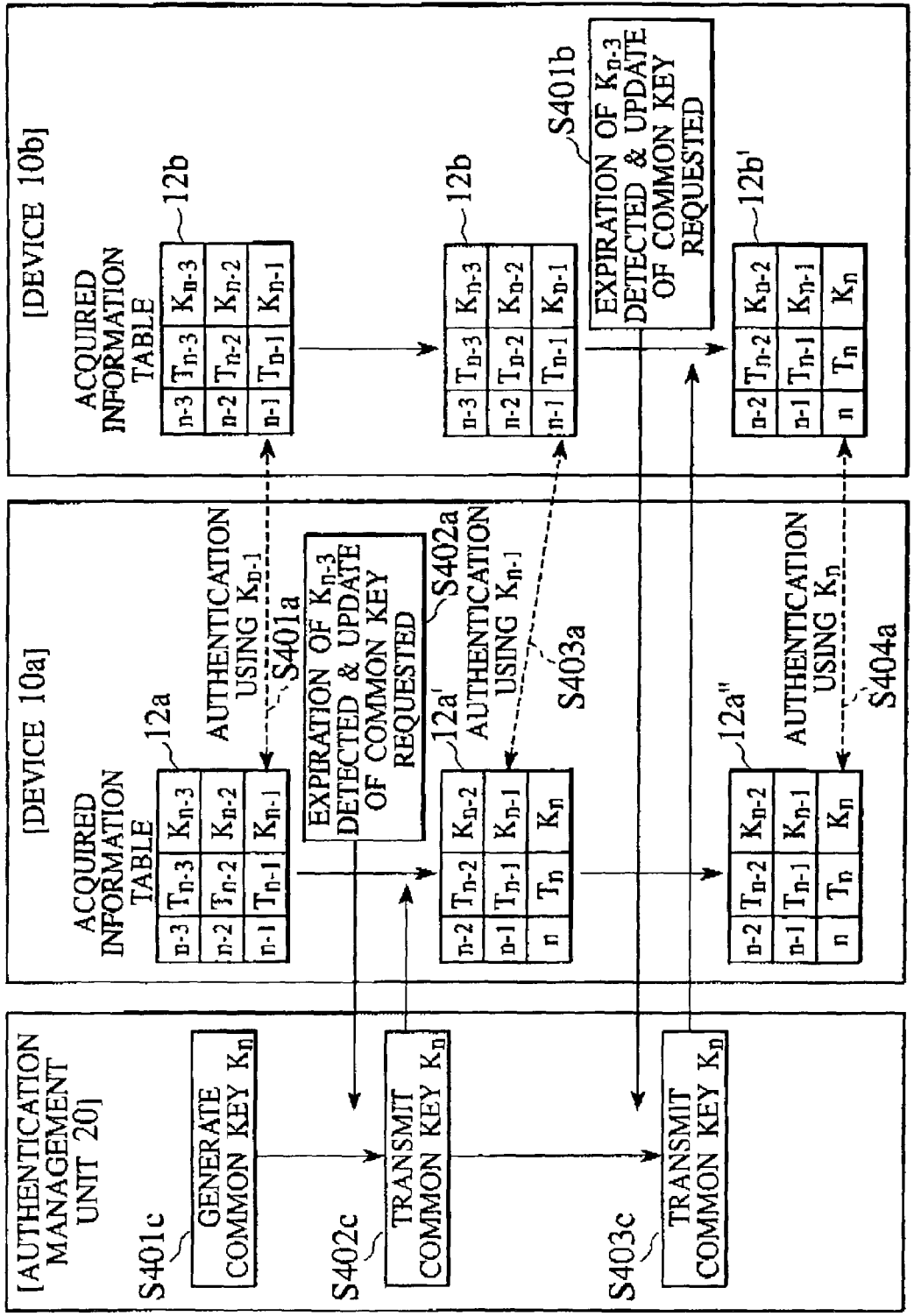
FIG. 15 is a diagram showing a procedure by which a device carries out the authentication with another device when a common key is updated from an authentication management unit in the first embodiment of the present invention.
Figure 16:
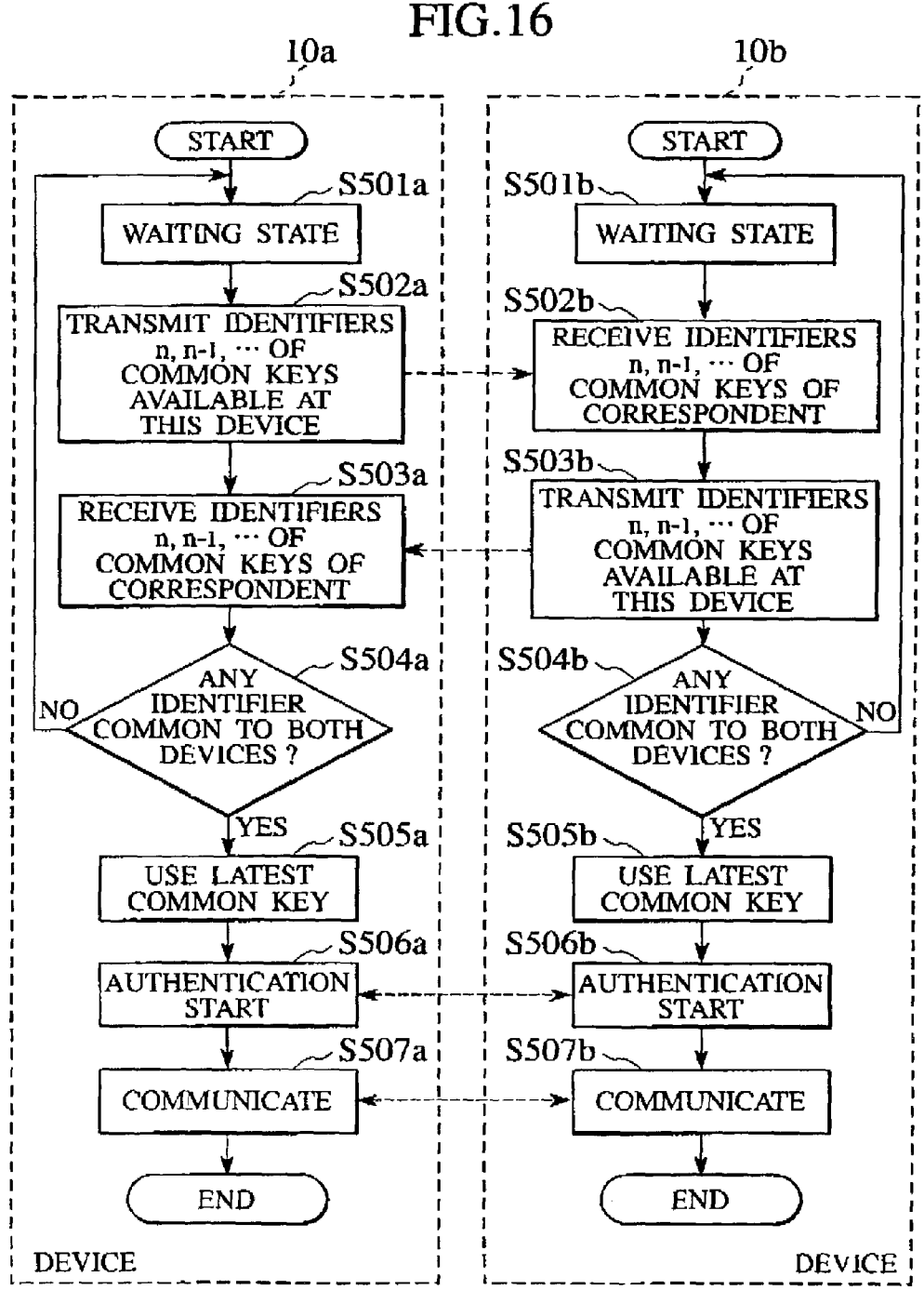
FIG. 16 is a flow chart showing a procedure by which a device carries our communications with another device in the first embodiment of the present invention.
Figure 17:
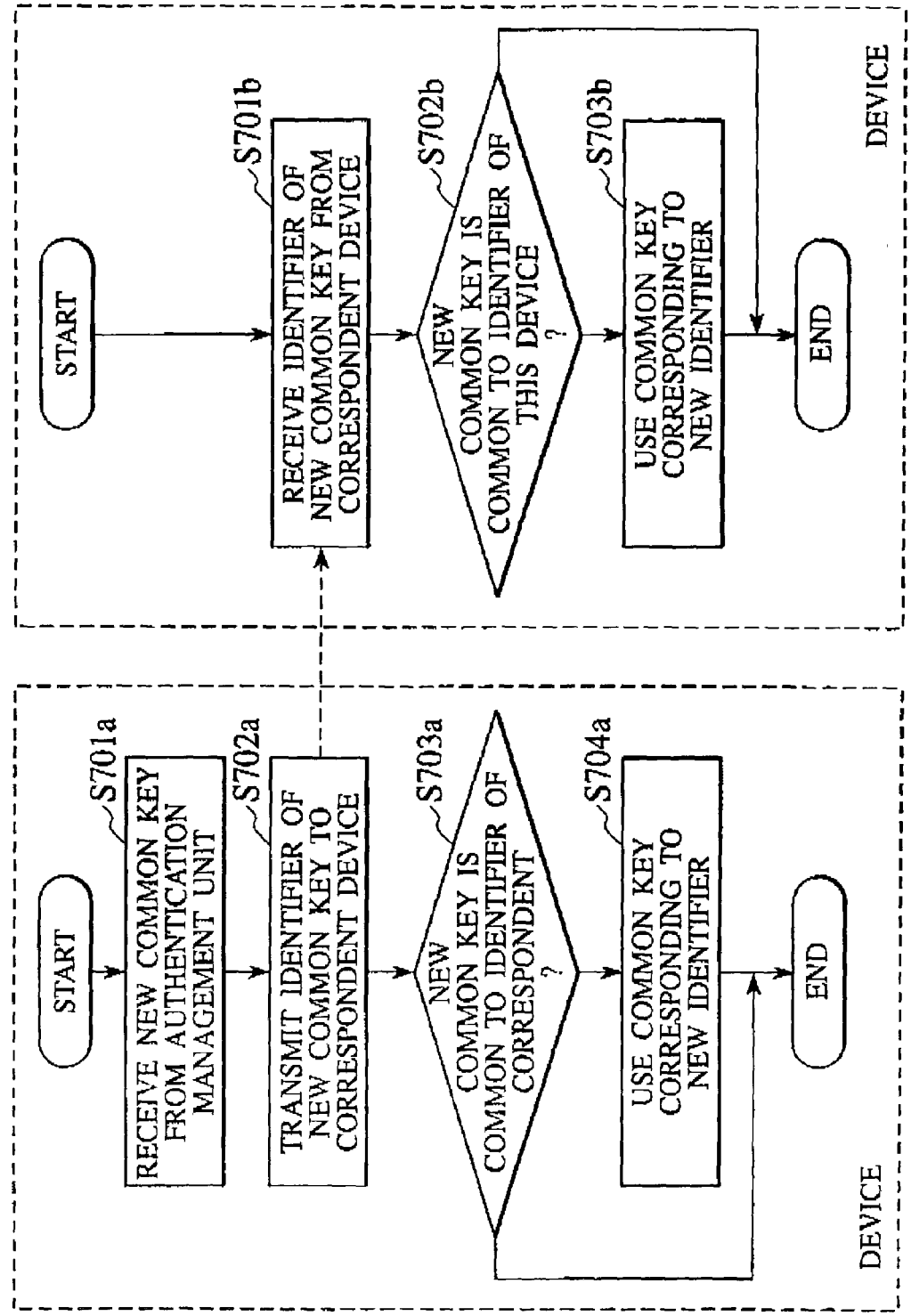
FIG. 17 is a flow chart showing a procedure by which a device carries out communications with another device when a common key is updated from an authentication management unit in the first embodiment of the present invention.

FIG. 15 to FIG. 17 show the procedure by which the device 10a and the device 10b select the authentication information to be used between the both devices 10a and 10b in time series. The following procedure shows in time series that the communications are carried out by using the common key stored in the acquired information table.

As shown in FIG. 15 and FIG. 16, in order for the device 10a to carry out the communications with the device 10b by using the common key Kn-1 stored in the acquired information storage unit 12 (S401a), first, the device 10a carries out the step for transmitting the identifiers (n-1 to n-3) of the common keys (Kn-1 to Kn-3) that are available for use with respect to the other device 10b (S501a and S502a).

More specifically, first, when the operation unit 11 (the operation unit 11 of the device 10a) detects the device authentication command signal for carrying out the authentication with the device 10b that is entered by the user operation, the operation unit 11 outputs the detected device authentication command signal to the acquired information management unit 13.

Then, when the device authentication command signal is entered from the operation unit 11, the acquired information management unit 13 outputs the entered device authentication command signal to the selection unit 15c, and when the device authentication command signal is entered from the acquired information management unit 13, the selection unit 15c acquires the identifiers (n-3, n-2, n-1, n) of the authentication informations corresponding to the device authentication command signal from the acquired information storage unit 12 according to the entered device authentication command signal, and outputs the acquired identifiers (n-3, n-2, n-1, n) to the communication unit 14.

After that, when the identifiers (n-3, n-2, n-1, n) are entered from the acquired information management unit 13, the communication unit 14 transmits the entered identifiers (n-3, n-2, n-1, n) to the communication unit 14 of the device 10b. On the other hand, the device 10b transmits the identifiers (n-3, n-2, n-1) stored in the acquired information storage unit 12 of the device 10b to the device 10a that has transmitted the identifiers (n-3, n-2, n-1, n) similarly as in the procedure described above (S501b and S502b).

Next, the device 10a compares the identifiers (n-3, n-2, n-1, n) stored in the acquired information storage unit 12 of the own device with the identifiers (n-3, n-2, n-1) received from the device 10b, and when they coincide, the device 10a encrypts the information data to be transmitted to the device 10b (S503a to S505a).

More specifically, the communication unit 14 of the device 10a acquires the identifiers (n-3, n-2, n-1) from the communication unit 25, and outputs the acquired identifiers (n-3, n-2, n-1) to the selection unit 15c. Then, when the identifiers (n-3, n-2, n-1) are entered from the communication unit 14, the selection unit 15c acquires the identifiers (n-3, n-2, n-1, n) corresponding to the common key K to be used by the own device from the acquired information storage unit 12, and compares the acquired identifiers (n-3, n-2, n-1, n) with the identifiers (n-3, n-2, n-1) entered from the communication unit 14.

When they are compared, the identifiers (n-3, n-2, n-1) are coinciding, so that the selection unit 15c selects the identifier n-1 with the longest valid period T among the coinciding identifiers (n-3, n-2, n-1), for example. Also, this selection of the identifier n-1 is carried out at the selection unit 15e of the device 10b by the same procedure as described above (S503b to S505b). Consequently, the selection unit 15c of the device 10b selects the identifier n-1 with the longest valid period T.

After that, the selection unit 15c that has selected the identifier n-1 acquires the common key Kn-1 corresponding to the selected identifier n-1 from the acquired information storage unit 12, and outputs the acquired common key Kn-1 to the authentication unit 16. Then, when the common key Kn-1 corresponding to the identifier n-1 is entered from the selection unit 15c, the authentication unit 16 encrypts the information data to be transmitted to the device 10b by using the entered common key Kn-1, and transmits the information data encrypted by using the common key Kn-1 to the device 10b.

In addition, when the information data encrypted by using the common key Kn-1 is received from the device 10a, the authentication unit 16 of the device 10b decrypts the received information data encrypted by using the common key Kn-1, by using the common key Kn-1 corresponding to the identifier n-1 available at the own device, so as to acquire the information data transmitted from the device 10a (S506a, S507a, S506b and S507b).

Next, the device 10a carries out the step for detecting the common key Kn-3 for which the valid period has expired among the authentication informations in the acquired information table 12a (S402a). More specifically, the valid period judgement unit 15a detects the common key Kn-3 for which the valid period has expired among the authentication informations in the acquired information table 12a according to the valid period information contained in the authentication information, and outputs a common key detection signal indicating that it is detected, to the acquired information management unit 13. Note that the step S402a is not necessarily dependent on the state of the communications between the device 100 and the device 10b. It is carried out whenever it is judged that the valid period of the common key K expires.

Then, when the common key detection signal is entered from the valid period judgement unit 15a, the acquired information management unit 13 outputs a common key request signal for requesting a new common key to the communication unit 14 according to the entered common key detection signal. After that, when the common key request signal is entered from the valid period judgement unit 15a, the communication unit 14 transmits the entered common key request signal to the authentication management unit 20.

Note that the authentication information (common key K) is to be generated regularly. More specifically, the secret information generation unit 22 generates the authentication information according to the time information (time) managed by the CPU (not shown) regularly, and stores the generated authentication information into the secret information storage unit 23 (S401c).

Next, the authentication management unit 20 carries out the step for transmitting the new common key Kn already generated at the step S401c to the device 10a in response to the request from the device 10a (S402c, S701a to S704a). More specifically, when the common key request signal is received from the communication unit 14, the authentication management unit 20 outputs the received common key request signal to the secret information management unit 24. Then, when the common key request signal is entered from the communication unit 25, the secret information management unit 24 acquires the common key Kn corresponding to the common key request signal from the secret information storage unit 23 according to the entered common key request signal, and outputs the common key Kn to the communication unit 25. Then, when the common key Kn is entered from the secret information management unit 22, the communication unit 25 transmits the entered common key Kn to the device 10a that has transmitted the common key request signal.

In addition, when the common key Kn is received from the authentication management unit 20, the communication unit 14 of the device 10a outputs the received common key Kn to the acquired information management unit 13, and when the common key Kn is entered from the communication unit 14, the acquired information management unit 13 stores the entered common key Kn into the acquired information storage unit 12. Here, the secret information management unit 22 stores the entered common key Kn in the descending order of the valid period (see the acquired information table 12a' of FIG. 15). Note that the common key Kn-3 for which the valid period has expired may be deleted from the acquired information table 12a'.

Next, the communications between the device 10a having the acquired information table 12a' and the device 10b having the acquired information table 12b are carried out (S402a, S701b to S703b) by the following procedure (the procedure of S402a is basically the same as the procedure of S401a).

More specifically, first, the communication unit 14 of the device 10a acquires the identifiers (n-3, n-2, n-1) from the device 10b, and outputs the acquired identifiers (n-3, n-2, n-1) to the selection unit 15c. Then, when the identifiers (n-3, n-2, n-1) are entered from the communication unit 14, the selection unit 15c acquires the identifiers (n-2, n-1, n) corresponding to the common key K to be used by the own device from the acquired information storage unit 12, and compares the acquired identifiers (n-2, n-1, n) with the identifiers (n-3, n-2, n-1) entered from the communication unit 14.

Among these identifiers, the identifiers (n-2, n-1) are coinciding, so that the selection unit 15c selects the identifier n-1 with the longest valid period T among these coinciding identifiers (n-2, n-1), for example. Also, this selection of the identifier n-1 is carried out at the selection unit 15e of the device 10b by the same procedure as described above.

After that, when the identifier n-1 is selected, the selection unit 15c acquires the common key Kn-1 corresponding to the selected identifier n-1 from the acquired information storage unit 12, and outputs the acquired common key Kn-1 to the authentication unit 16. When the common key Kn-1 corresponding to the identifier n-1 is entered from the selection unit 15c, the authentication unit 16 encrypts the information data to be transmitted to the device 10b by using the entered common key Kn-1, and transmits the information data encrypted by using the common key Kn-1 to the device 10b.

Then, when the information data encrypted by using the common key Kn-1 is received from the device 10*a*, the authentication unit 16 of the device 10*b* decrypts the received information data encrypted by using the common key Kn-1, by using the common key Kn-1 corresponding to the identifier n-1 available at the own device, so as to acquire the information data transmitted from the device 10*a*.

Next, the device 10*b* carries out the step for detecting the common key Kn-3 for which the valid period has expired among the authentication informations in the acquired information table 12*b* (S401*b*). More specifically, the valid period judgement unit 15*a* detects the common key Kn-3 for which the valid period has expired among the authentication informations in the acquired information table 12*b* according to the valid period information contained in the authentication information, and outputs a common key detection signal indicating that it is detected, to the acquired information management unit 13.

Then, when the common key detection signal is entered from the valid period judgement unit 15*a*, the acquired information management unit 13 outputs a common key request signal for requesting a new common key to the communication unit 14 according to the entered common key detection signal. After that, when the common key request signal is entered from the valid period judgement unit 15*a*, the communication unit 14 transmits the entered common key request signal to the authentication management unit 20.

Next, the authentication management unit 20 carries out the step for transmitting the new common key Kn to the device 10*b* in response to the request from the device 10*b* (S403*c*). More specifically, when the common key request signal is received from the communication unit 14, the authentication management unit 20 outputs the received common key request signal to the secret information management unit 24. Then, when the common key request signal is entered from the communication unit 25, the secret information management unit 24 acquires the common key Kn corresponding to the common key request signal from the secret information storage unit 23 according to the entered common key request signal, and outputs the common key Kn to the communication unit 25. Then, when the common key Kn is entered from the secret information management unit 22, the communication unit 25 transmits the entered common key Kn to the device 10*b* that has transmitted the common key request signal.

In addition, when the common key Kn is received from the authentication management unit 20, the communication unit 14 of the device 10*b* outputs the received common key Kn to the acquired information management unit 13, and when the common key Kn is entered from the communication unit 14, the acquired information management unit 13 stores the entered common key Kn into the acquired information storage unit 12. Here, the secret information management unit 22 stores the entered common key Kn in the descending order of the valid period (see the acquired information table 12*b'* of FIG. 15). Note that the common key Kn-3 for which the valid period has expired may be deleted from the acquired information table 12*b'*.

Next, the device 10*a* carries out the step for carrying out the communications with the device 10*b* by using the common key Kn (S403*a*). This step (S403*a*) is carried out by the procedure similar to the step (401*a*) described above, so that the description of the step (S403*a*) will be omitted here.

In this way, even when the device 10*a* and the device 10*b* acquire the new common key from the authentication management unit 20 and the common keys in the acquired information tables 12*a* and 12*b* are different at some point, the device 10*a* and the device 10*b* can use the common key that is common to the both devices and stored in the acquired information tables 12*a* and 12*b* so that even if the common key is updated in a middle of the communications, it is possible to acquire the information data from the device 10*a* or the device 10*b* without interrupting the communication state in a middle.

On the other hand, when the device 1*a* continues to update the common key from the authentication management unit 20 and the common key that is common to the device 10*a* and the device 10*b* runs out, there is no common key that is common to the device 10*a* and the device 10*b*, so that the communications with the device 10*b* becomes impossible. For this reason, the device 10*a* no longer has the common key that is common to the device 10*a* and the device 10*b* and the radio network formed between the device 10*a* and the device 10*b* is released, so that it becomes impossible to carry out the transmission and reception of the information data by using the common key that is common to both devices 10*a* and 10*b*.

Figure 18:
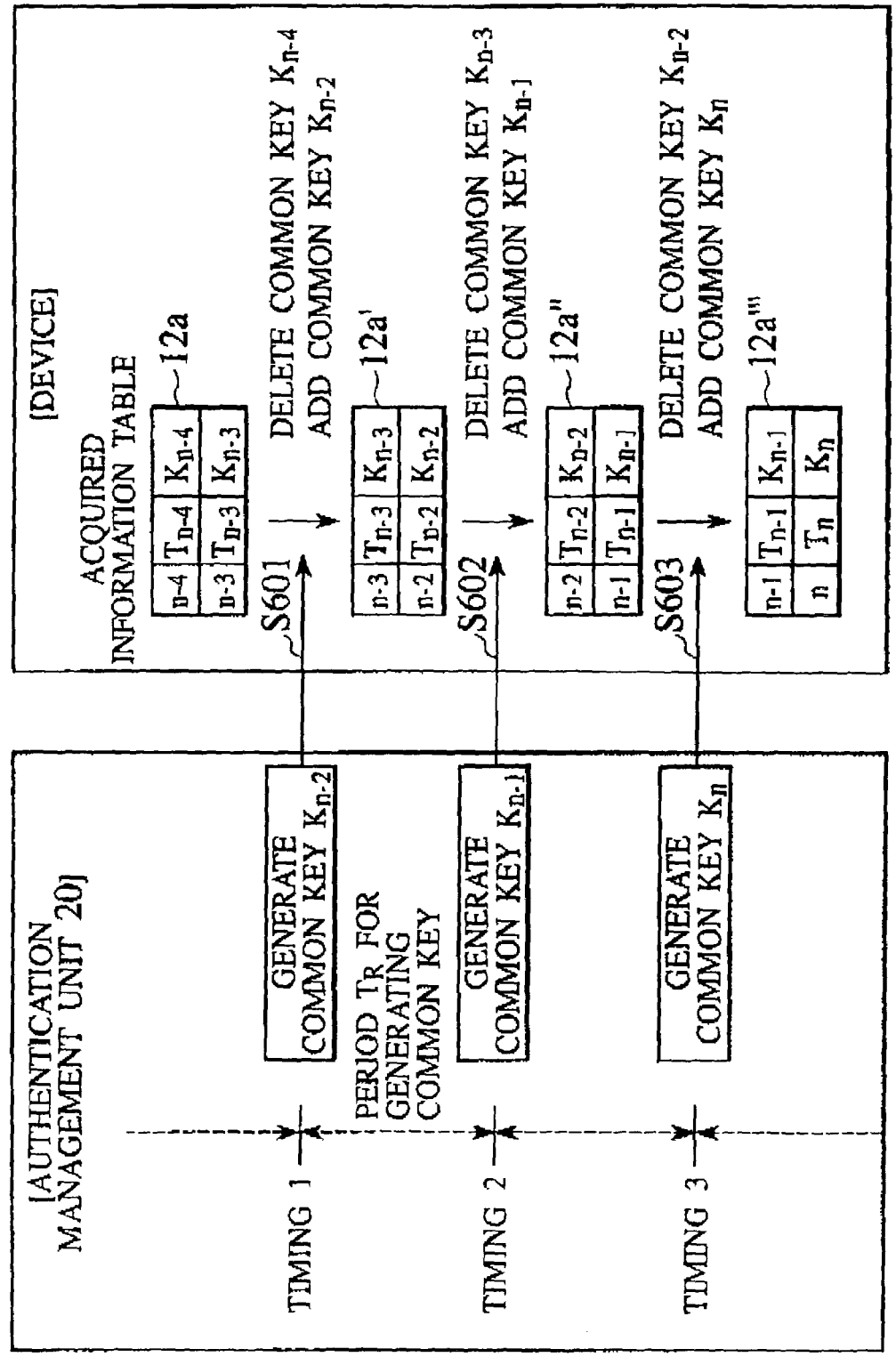
FIG. 18 is a diagram showing a procedure by which a device updates a common key from an authentication management unit in the first embodiment of the present invention.

Note that the method by which the device 10 acquires the new common key K from the authentication management unit 20 can also be realized by the procedure shown in FIG. 18, besides that described above. In FIG. 18, the device 10 acquires the common key from the authentication management unit 20, stores the acquired common key into the acquired information table 12*a*, and deletes the oldest common key among the common keys stored in the acquired information table 12*a*. The concrete internal operations (operations of the authentication unit 16, etc.) shown in FIG. 18 are the same as those described above.

The authentication management unit 20 shown on the left side of FIG. 18 generates the common keys Kn-2, Kn-1 and Kn in time series at a constant period Tr, and sequentially transmits the generated common keys Kn-2, Kn-1 and Kn. When the common keys Kn-2, Kn-1 and Kn are received from the authentication management unit 20, the device 10 stores the received common keys Kn-2, Kn-1 and Kn into the respective acquired information tables 12*a* to 12*a'''*, and deletes the oldest common key among the common keys stored in the acquired information tables 12*a* to 12*a'''* (S601 to S603).

More specifically, the selection unit 15*c* acquires a plurality of the second authentication informations generated at a prescribed period by the secret information generation unit 22, and when the number of the plurality of the acquired second authentication informations exceeds a prescribed number, the selection unit 15*c* deletes one of the plurality of the acquired second authentication informations. Namely, the common key Kn-2 received by the device 10 at a timing-1 in FIG. 18 will be deleted from the acquired information table 12*a* after the timing-3 is past. For this reason, the valid period of the common keys stored in the acquired information table 12*a* becomes 2Tr. In this way, the device 10 can acquire the prescribed common key when the specific period Tr has past, so that there is no need to measure the valid period of the common key by using an internally provided timer.

(Effects of the Device Authentication Management System and the Device Authentication Management Method)

According to the device authentication management system and the device authentication management method according to this embodiment as described above, the device 10 carries out the authentication in order to carry out communications with the authentication management unit 20 by using the first authentication information (master key M) acquired in advance from the authentication management unit 20, so that the communications with the authentication management unit 20 cannot be carried out unless it has the first authentication information (master key M). For this reason, the authentication management unit 20 can avoid the communications with the device that does not have the first authentication information, so that it is possible to eliminate the improper access from the device 10 that does not have the first authentication information.

Also, the device 10 that has the second authentication information cannot carry out the communications with the other device without using the second authentication information, so that it is possible to form the radio network with the other device 10 that has the second authentication information, by using that second authentication information. For this reason, each device 10 that formed the radio network by using the second authentication information can eliminate the communications from the device 10 that does not have the second authentication information, and therefore it is possible to prevent the information data such as the secret documents from being leaked to the device 10 that does not have the second authentication information.

Also, the second authentication information contains the valid period of the second authentication information, so that each device 10 that formed the radio network by using the second authentication information can eliminate the device 10 for which the valid period of the second authentication information has expired from the radio network. Also, even when the device 10 that has the second authentication information is stolen, it becomes impossible for a person who has stolen that device 10 to carry out the communications with the device that has the second authentication information when the valid period of the second authentication information expires.

For this reason, even when the device that belongs to the radio network is stolen, each device 10 that formed the radio network can eliminate that stolen device 10 from the radio network when the valid period of the second authentication device available at that stolen device 10 expires, so that it is possible to prevent the information data in the radio network from being leaked to the external indefinitely.

In addition, the selection unit 15c of each device 10 acquires the identifiers contained in the second authentication informations available at the other device 10, extracts the identifier that is common among the acquired identifiers and the identifiers contained in the second authentication informations stored at the acquired information storage unit 12, and selects the second authentication information corresponding to the valid period information, according to the valid period information corresponding to the extracted identifier, so that even when each device 10 has a plurality of the second authentication informations, it is possible to select the second authentication information that is common to the devices.

[Second Embodiment]

Referring now to FIG. 19 to FIG. 24, the second embodiment of a device authentication management system according to the present invention will be described in detail.

(Configuration of the Device Authentication Management System)

Figure 19:
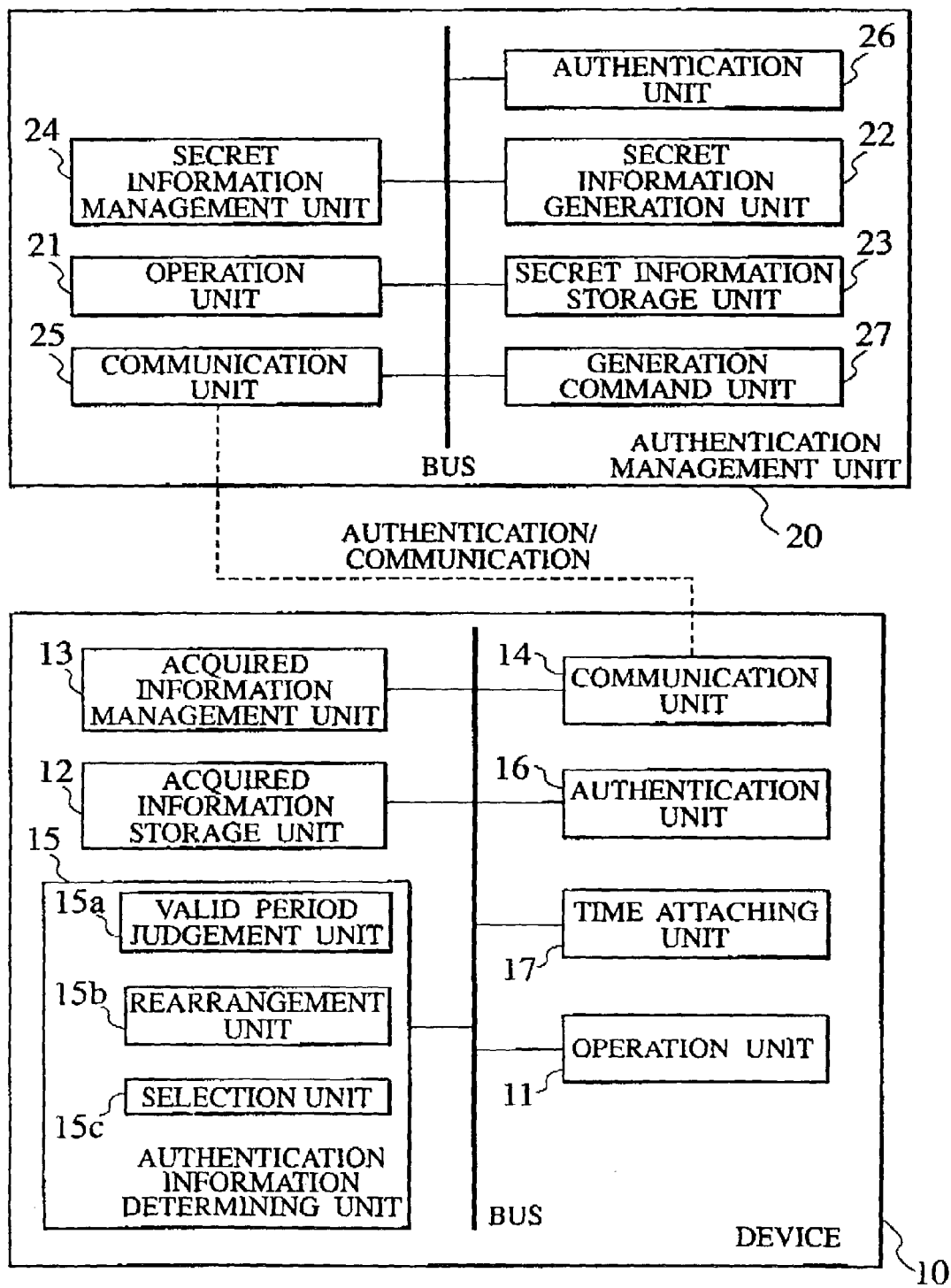
FIG. 19 is a block diagram showing an internal configuration of the device authentication management system according to the second embodiment of the present invention.

FIG. 19 shows an internal configuration of a device authentication management system according to this embodiment. The configuration of FIG. 19 is similar to that internal configuration of the device authentication management system according to the first embodiment (see FIG. 2), but differs in that the authentication management unit 20 has a generation command unit 27 and the device 10 has a time attaching unit 17. The rest of the configuration is the same as that of the first embodiment so that its description will be omitted here.

In the first embodiment, the selection unit 15c judged which authentication information is to be used according to the valid period or the identifier contained in the authentication information (the identifier of the authentication information, the valid period of the common key, the common key), whereas in this embodiment, the selection unit 15c judges which authentication information is to be used according to the time at which the authentication information is acquired from the authentication management unit 20 and the valid period of the acquired authentication information. The further details are as follows.

Figure 20:
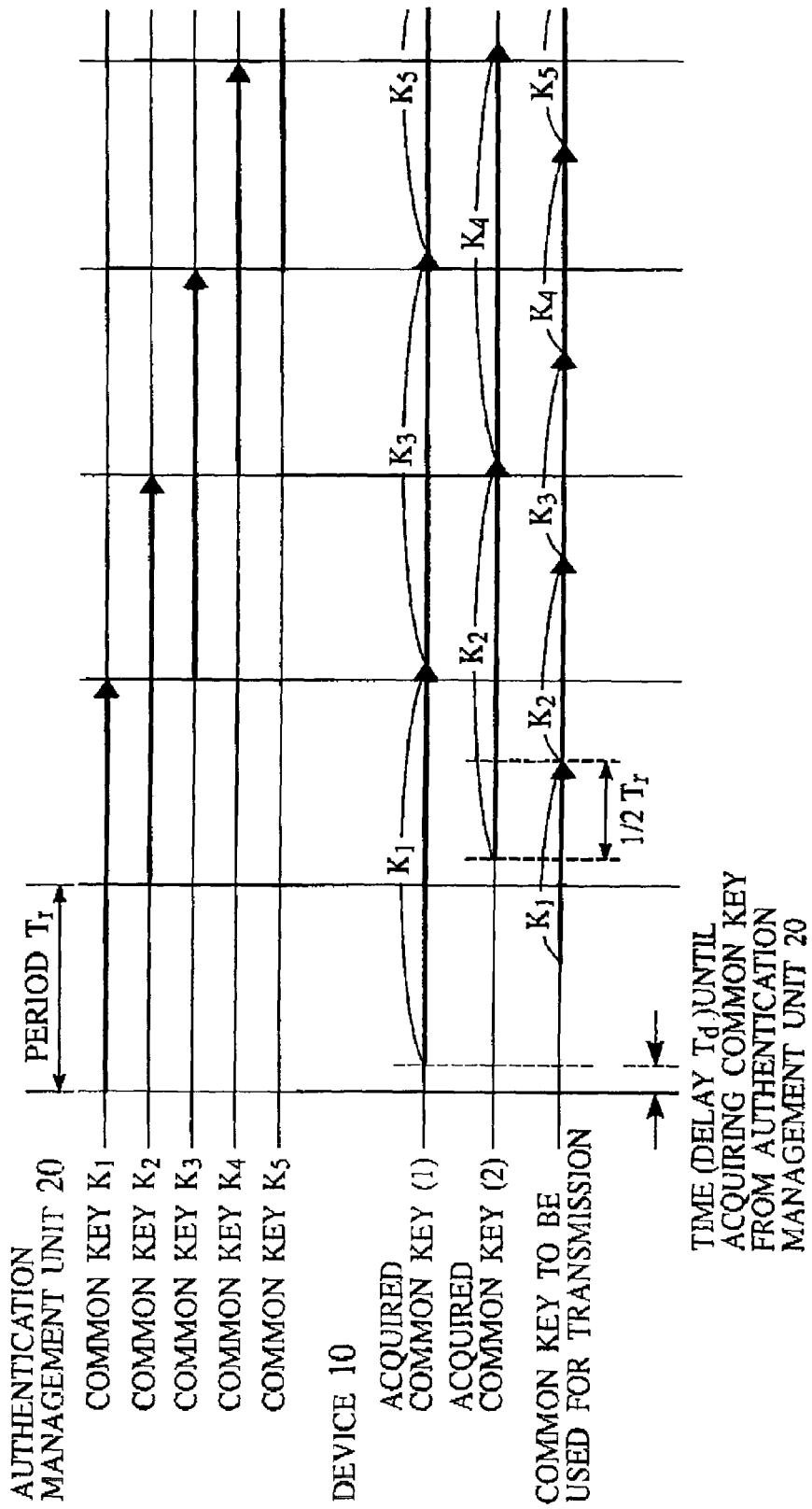
FIG. 20 is a diagram showing a procedure by which a device acquires common keys at prescribed timings from an authentication management unit in the second embodiment of the present invention.

The generation command unit 27 commands the generation of the secret information to the secret information generation unit 22 at a prescribed period. More specifically, as shown in FIG. 20, when the prescribed period Tr has elapsed, the generation command unit 27 outputs a generation signal for generating the common key to the secret information generation unit 22. When the generation signal is entered from the generation command unit 27, the secret information generation unit 22 generates a new common key K according to the entered generation signal, and outputs the generated common key K to the generation command unit 27.

Note that the common keys K1 to K5 shown in FIG. 20 are the common keys that are sequentially generated in response to the generation signals by the secret information generation unit 22 according to the generation signals that are sequentially entered at the prescribed period Tr from the generation command unit 27.

When the common keys K1 to K5 are entered from the secret information generation unit 22, the generation command unit 27 outputs the common key K1 and K2 (the common keys requested from the user) to the authentication unit 26 unconditionally in response to the generation signals from the command unit 27 regardless of the requests from the device 10, and stores the entered common keys K1 to K5 into the secret information storage unit 23. When the common keys K1 and K2 are entered from the generation command unit 27, the authentication unit 20 encrypts the entered common keys K1 and K2 by using the master key M, and outputs the encrypted common keys K1 and K2 to the communication unit 25. When the encrypted common keys K1 and K2 are entered, the communication unit 25 transmits the entered common keys K1 and K2 to the communication unit 14 of the device 10.

The time attaching unit 17 attaches the time at which the communication unit 14 acquired the second authentication information from the authentication management unit 20, to the second authentication information. More specifically, when the common keys K1 and K2 are received from the communication unit 25, the time attaching unit 17 attaches the time (time information) at which the common keys K1 and K2 are received, and outputs the common keys K1 and K2 with the time information attached thereto to the acquired information management unit 13. When the common keys K1 and K2 with the time information attached thereto are entered from the time attaching unit 17, the acquired information management unit 13 stores the entered common keys K1 and K2 into the acquired information storage unit 12.

Note that, as shown in FIG. 20, there is a slight delay Td between the timing at which the common keys (K1 and K2) generated by the secret information generation unit 22 are received at the communication unit 14 and the timing at which the common keys (k1 and K2) are generated at the secret information generation unit 22. The causes of this delay Td may include that it takes some time for the communication start procedure carried out between the authentication management unit 20 and the device 10, that the communication network is congested, and that the power of the device 10 is not turned on at a time of the generation by the secret information generation unit 22 so that the device 10 is in a state in which it cannot request the common keys to the authentication management unit 20.

The selection unit 15*c* first checks the common keys (K1 and K2) and removes those for which ½Tr has elapsed from the time information (there can be cases where only K2 is removed and K1 remains, and cases where both K1 and K2 remain without being removed). Next, the common key with the latest time information among the remaining keys is selected (that is, K1 will be selected when only K1 is remaining, and K2 will be selected if both K1 and K2 are remaining).

Note that the selection unit 15*c* acquires a plurality of the second authentication informations (authentication informations) to which the times are attached by the time attaching unit 17 and selects one second authentication information corresponding to the time from the plurality of the second authentication informations with the times attached thereto according to the attached times. More specifically, the selection unit 15*c* can acquire the common keys (K1 and K2) with the time information attached thereto that are scored in the acquired information storage unit 12 according to the command from the acquired information management unit 13, and select the common key K1 with the earliest time information (time at which it is acquired from the authentication management unit 20) among the acquired common keys (K1 and K2).

(Device Authentication Management Method Using the Device Authentication Management System)

The device authentication management method using the device authentication management system in the above described configuration can be executed by the following procedure. Note that the method by which the device 10 transmits the information data to the other device 10 by using the common key K selected by the selection unit 15*c* is the same as that in the first embodiment described above.

Figure 21:
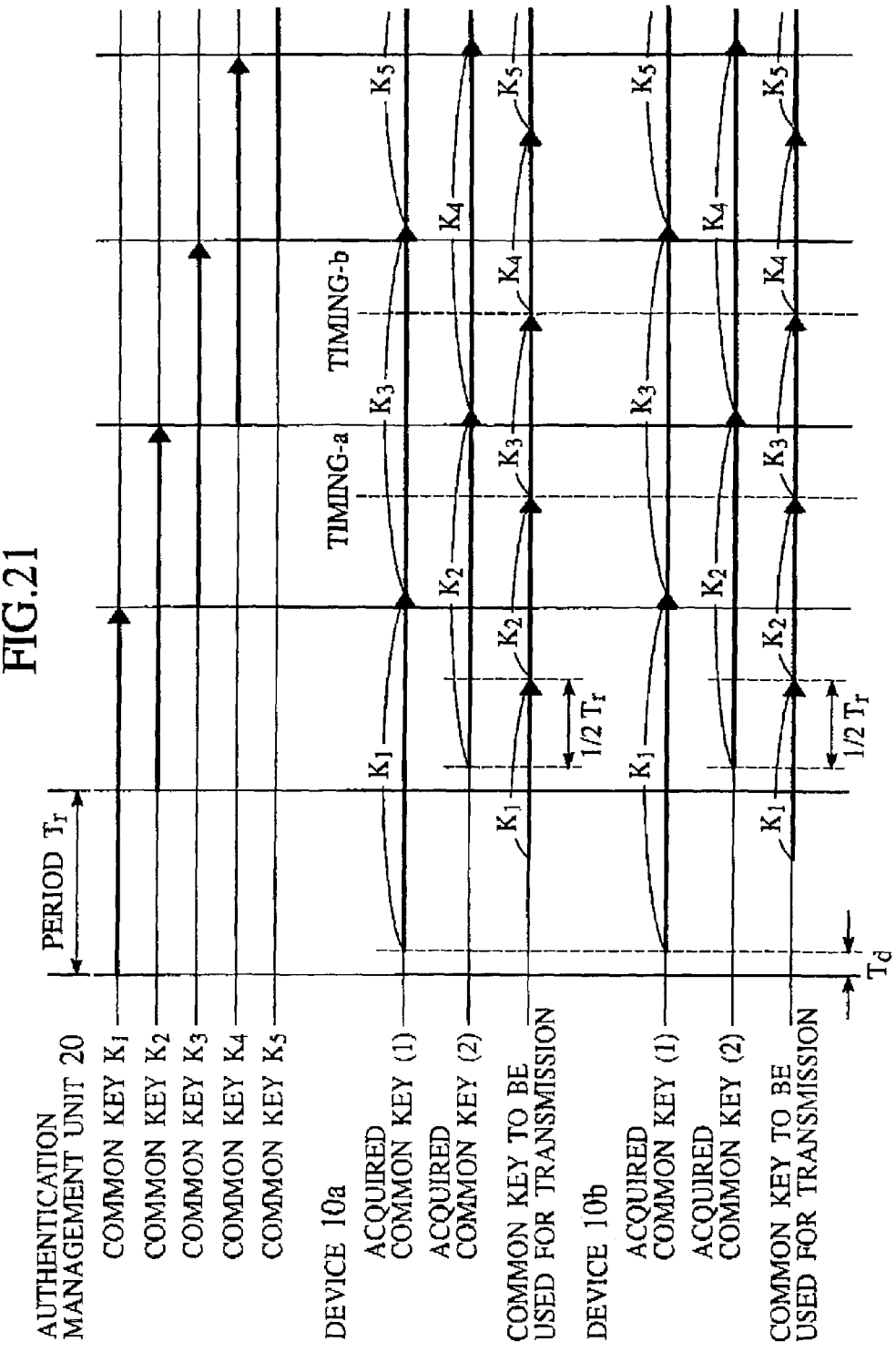
FIG. 21 is a diagram showing one procedure by which a plurality of devices acquire common keys at prescribed timings from an authentication management unit in the second embodiment of the present invention.

(1) The Case Where the Selection Units 15*c* of the Device 10*a* and the Device 10*b* Respectively Select the Common Keys (K1, K2) Acquired at the Same Time From the Authentication Management Unit 20:

FIG. 21 shows a timing chart showing the common keys (K1 to K5) that are acquired at the same time from the authentication management unit 20 by the device 10*a* (10*b*). In the following, a method by which the selection unit 15*c* of the device 10*a* (10*b*) selects the common keys (k1, K2) acquired at the same time from the authentication management unit 20 according to the time attached by the time attaching unit 17 will be described with reference to the timing chart of FIG. 21.

First, the secret information generation unit 22 carries out the step for generating the common key at each prescribed period Tr. More specifically, as shown in FIG. 21, when the prescribed period Tr has elapsed, the generation command unit 27 outputs the generation signal for generating the common keys (K1 to K5) to the secret information generation unit 22. Then, when the generation signal is entered from the generation command unit 27, the secret information generation unit 22 generates the new common keys K1 to K5 according to the entered generation signal, and outputs the generated common keys K1 to K5 to the generation command unit 27.

Next, the authentication management unit 20 carries out the step for transmitting the newly generated common key K1 to the device 10*a* (10*b*). (In this embodiment, the common key is generated one by one, but it is also possible to generate a plurality of common keys simultaneously (at the left end time of FIG. 20) by making the authentication server initial setting at the authentication management unit 20.) More specifically, when the common keys K1 to K5 are entered from the secret information generation unit 22, the generation command unit 27 outputs the entered common key K1 (the common key requested from the user) to the authentication unit 26, and stores the entered common keys K1 to K5 into the secret information storage unit 23.

Note that the authentication management unit 20 can also transmit the common key in response to the request or the like from the device 10*a* (10*b*). In this case, the common key is acquired from the secret information storage unit 23, and outputted to the authentication unit 26.

Then, when the common key K1 is entered from the generation command unit 27, the authentication unit 26 encrypts the entered common key K1 by using the master key M, and outputs the encrypted common key K1 to the communication unit 25. When the encrypted common key K1 is entered, the communication unit 25 transmits the entered common key K1 to the communication unit 14 of the device 10.

Next, the device 10*a* (10*b*) carries out the step for attaching the time information according to the common key K1 received from the authentication management unit 20. More specifically, when the common key K1 is received from the communication unit 25, the time attaching unit 17 attaches the time (time information) at which that common key K1 is received, and outputs the common key K1 with the time information attached thereto to the acquired information management unit 13. Then, when the common keys K1 and K2 with the time information attached thereto are entered from the time attaching unit 17, the acquired information management unit 13 stores the entered common keys K1 and K2 into the acquired information storage unit 12.

After that, when the device authentication command signal is entered at the operation unit 11, the selection unit 15*c* acquires the common keys (K1, K2) with the time information attached thereto which are stored in the acquired information storage unit 12 according to the command from the acquired information management unit 13, selects one of the acquired common keys (K1, K2) according to the procedure described above, and outputs it to the authentication unit 16.

Note that, as shown in FIG. 21, the device 10*a* and the device 10*b* have the identical acquisition time (time information) of the common keys (K1, K2, K3) acquired from the authentication management unit 20, and the common key K3 to be used between a timing-a and a timing-b in FIG. 21 is common to both devices 10*a* and 10*b*. For this reason, the device 10*a* and the device 10*b* can carry out communications of the information data to be carried oat between the device 10*a* and the device 10*b*, between the timing-a and the timing-b by using the common key K3 common to both of them.

Figure 22:
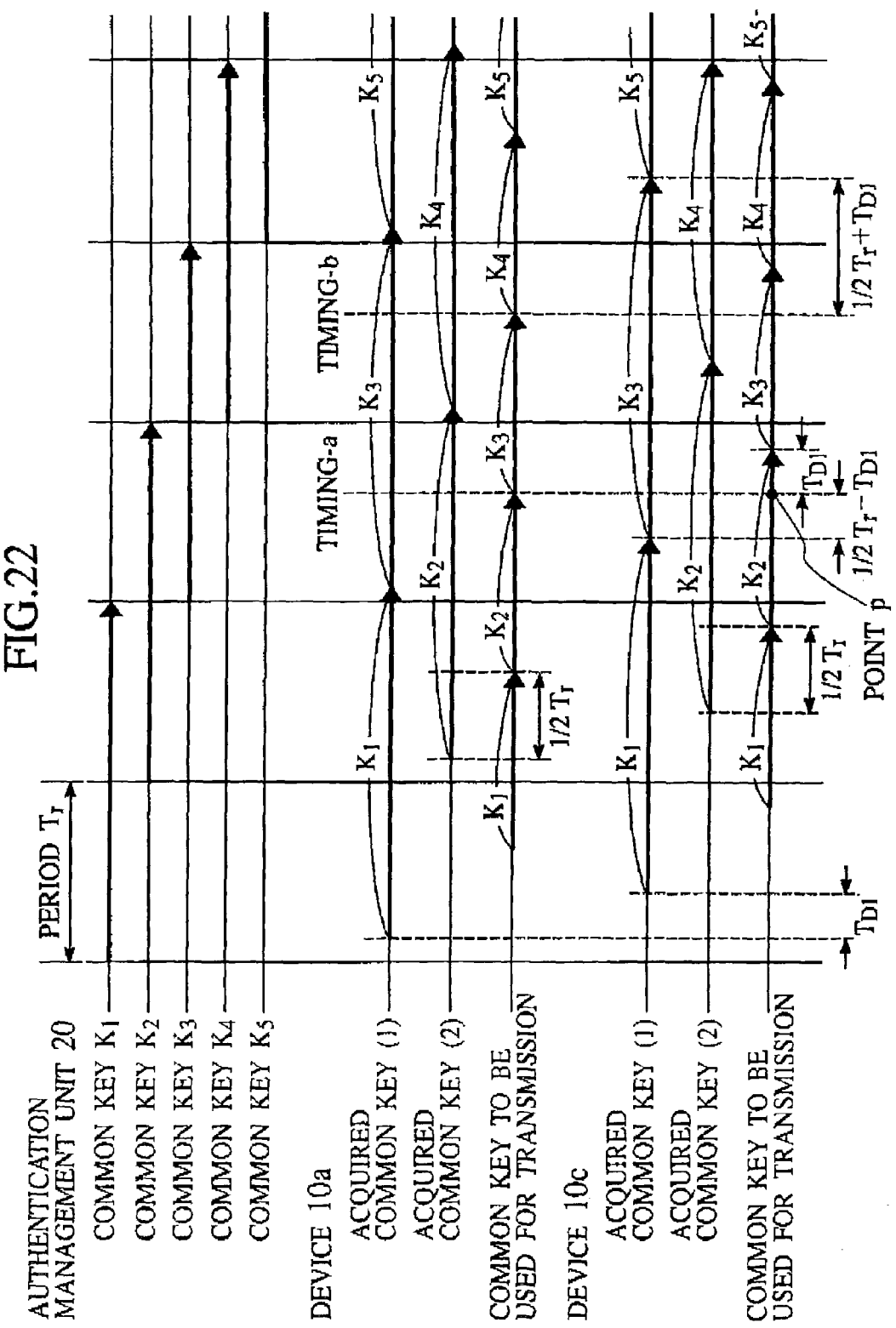
FIG. 22 is a diagram showing another procedure by which a plurality of devices acquire common keys at prescribed timings from an authentication management unit in the second embodiment of the present invention.
Figure 23:
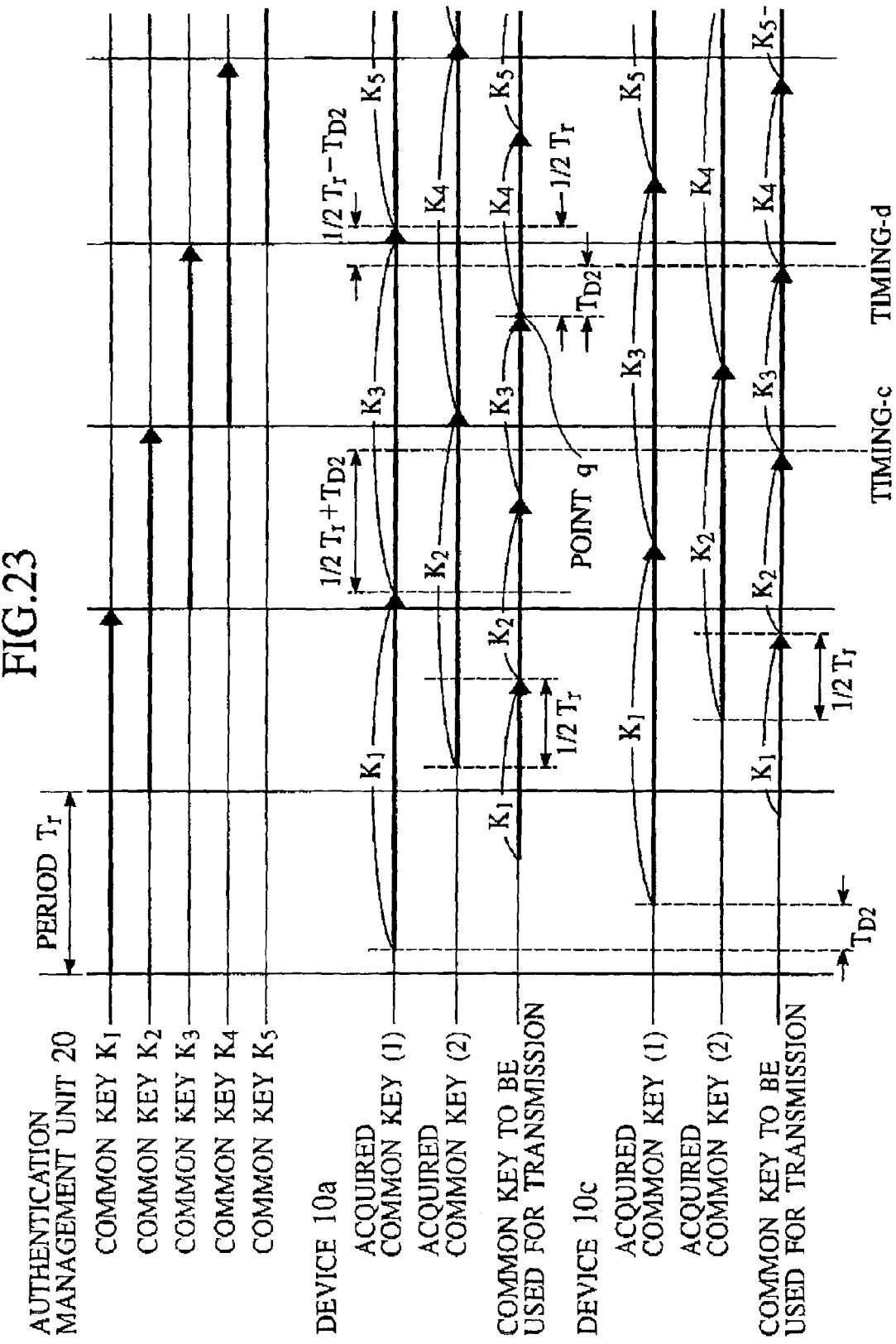
FIG. 23 is a diagram showing a procedure by which a plurality of devices using different communication schemes acquire common keys at prescribed timings from an authentication management unit in the second embodiment of the present invention.

Note that FIG. 22 and FIG. 23 show timing charts showing that the communications between the devices 10*a* and 10*b* are carried out as the selection units 15*c* of the device 10a and the device 10c respectively use the common keys (K1, K2) acquired at different times from the authentication management unit 20.

In FIG. 22, TD1 indicates a time difference between the acquisition time (time information) of the common key acquired from the authentication management unit 20 by the device 10a and the acquisition time (time information) of the common key acquired from the authentication management unit 20 by the device 10c.

As shown in FIG. 22, the time since the device 10b acquires the common key from the authentication management unit 20 until it becomes possible to use the common key K3 with the device 10a is ½Tr-TD1. For this reason, the device 10a will have a period of time during which the own device cannot transmit the information data to the device 10c if TD1 becomes larger than ½Tr, according to the above described ½Tr-TD1.

Consequently, in this case, when the device 10a transmits the information data to the device 10c, the selection unit 15c of the device 10c sets the time for using the common key K3 earlier by ½Tr from the point p of FIG. 22 (which will be referred to simply as "margin" hereafter), in order to make it corresponding to the common key K3 to be used by the device 10a, between the timing-a and the timing-b. In this way, the common key K3 between the timing-a and the timing-b becomes the same among the device 10a and the device 10c, so that the device 10a and the device 10c can carry out the transmission and reception of the information data by using the common key K3. Note that the device 10c can transmit the information data to the device 10a as long as the above described TD1 is smaller than ½Tr.

Also, FIG. 23 shows the timing chart in the case where the device 10c transmits the information data to the device 10a, conversely to the case of FIG. 22. Similarly as in the above described case, the device 10c will have a period of time during which the own device cannot transmit the information data to the device 10a if TD2 becomes larger than ½Tr, according to ½Tr-TD2 indicated in FIG. 23, between the timing-c and the timing-d.

Consequently, in this case, when the device 10c transmits the information data to the device 10a, the selection unit 15c of the device 10a sets the time for ending the use of the common key K3 later by ½Tr from the point q of FIG. 23 (which will be referred to simply as "margin" hereafter), in order to make it corresponding to the common key K3 to be used by the device 10c, between the timing-c and the timing-d. In this way, the common key K3 between the timing-c and the timing-d becomes the same among the device 10a and the device 10c, so that the device 10a and the device 10e can carry out the transmission and reception of the information data by using the common key K3. Note that the device 10c can transmit the information data to the device 10a as long as tile above described TD1 is smaller than ½Tr.

Also, when the device 10a (10b) has n sets of the common keys, the device 10a (10b) uses the newest common key among the secret information for which the time longer than or equal to ½Tr (n-1) [the general formula of the above described procedure] has elapsed since the n sets of the common keys are acquired from the authentication management unit 20. For this reason, when there is a difference in the time at which the common keys are acquired between the device 10a and the device 10b, the device 10a (10b) can carry out the transmission and reception of the information data between the device 10a and the device 10b by giving a margin of ½Tr(n-1) time (the general formula of the above described "margin") to the time at which the common key can be used so that the common keys of the devices 10a and 10b become equal.

Figure 24:
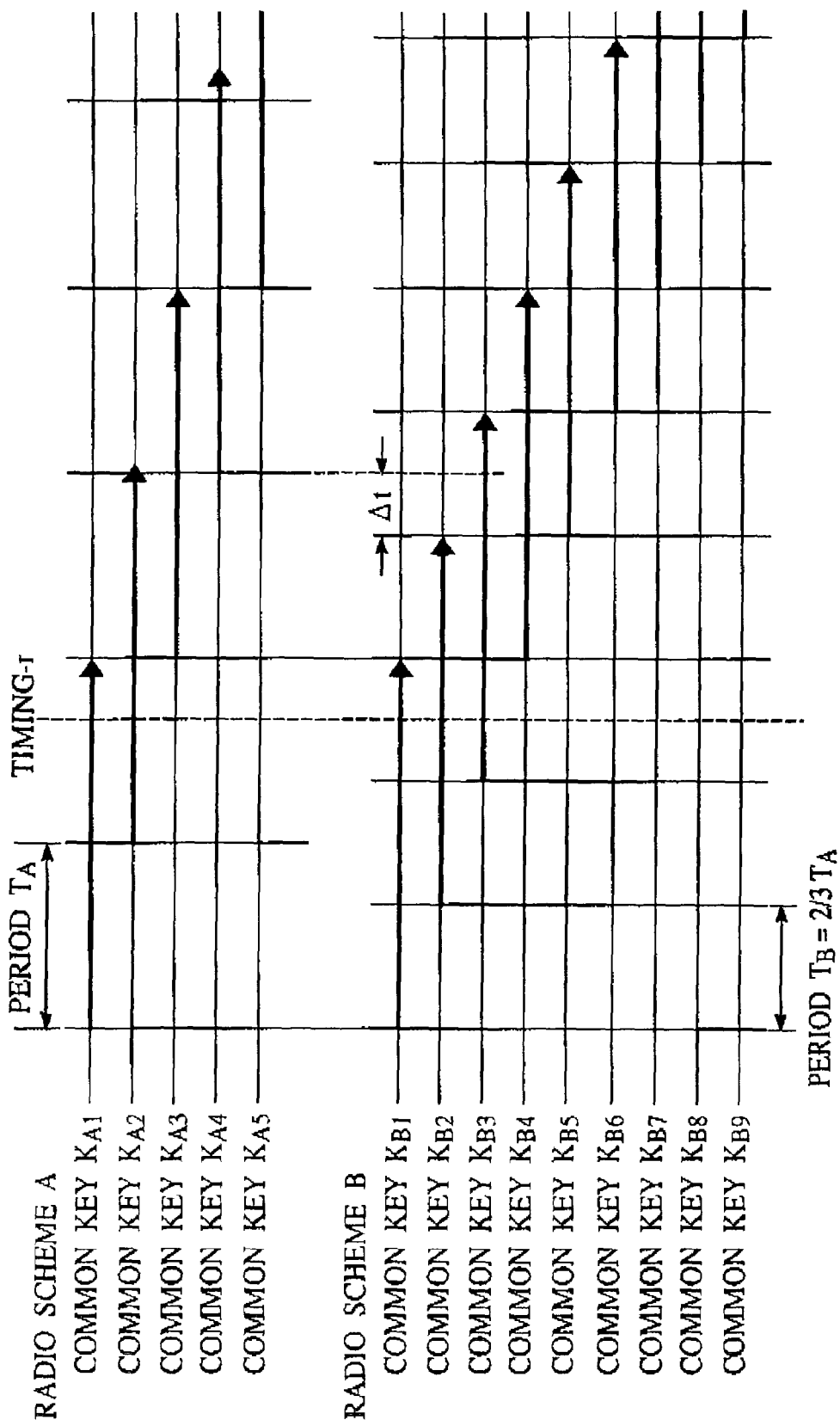
FIG. 24 is a diagram showing a procedure by which a plurality of devices using different communication schemes acquire common keys at different updating periods from an authentication management unit in the second embodiment of the present invention.
Figure 25:
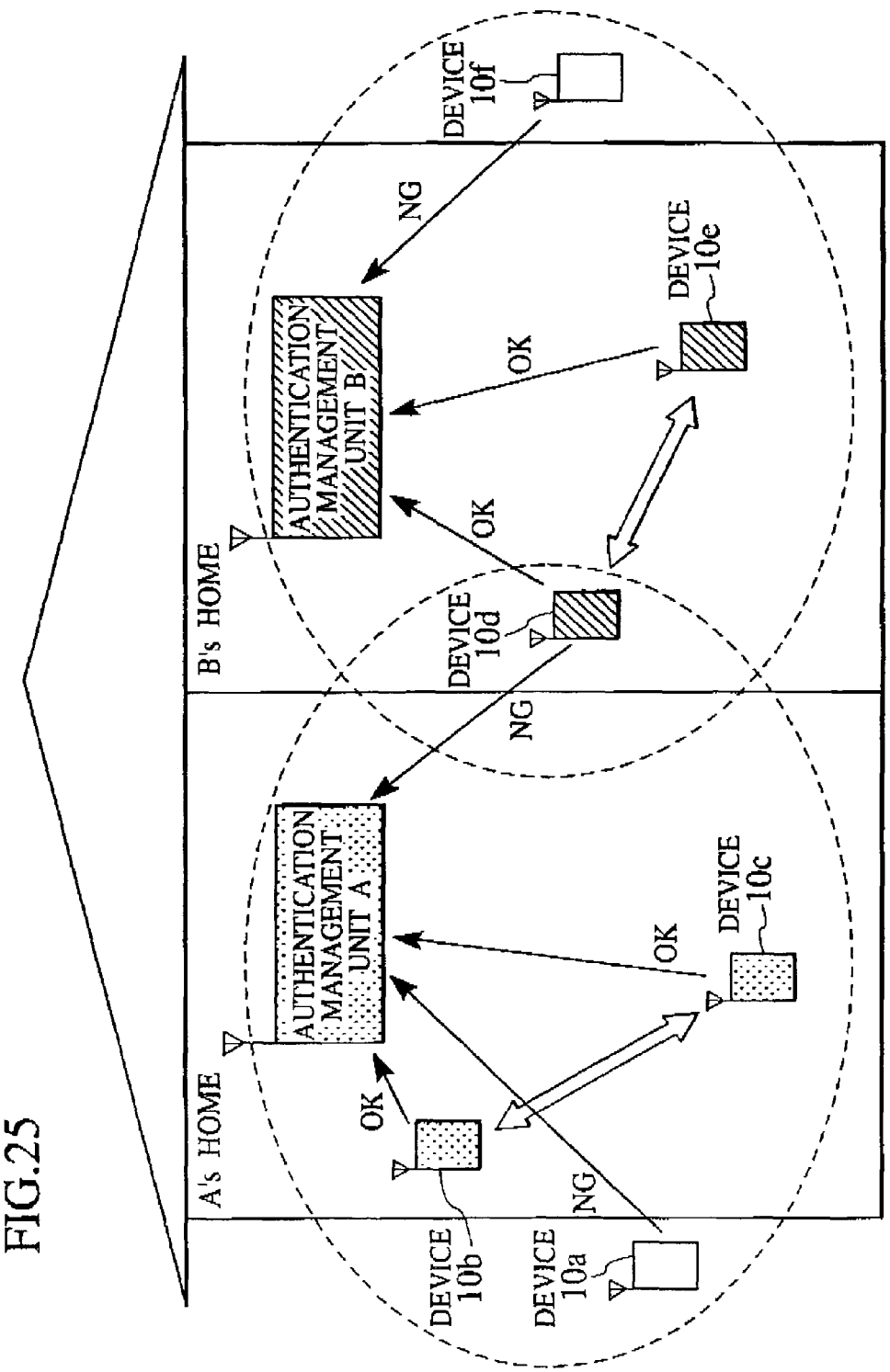
FIG. 25 is a diagram showing a conventional home radio network.

FIG. 24 shows that the valid periods of the common keys available at the device 10a of the radio scheme A and the device 10b of the radio scheme B are nearly the same even when the radio scheme A and the radio scheme B are different.

As shown in FIG. 24, the valid periods of the common keys ($K_{A\ 1}$ to $K_{A\ 6}$) available at the device 10a of the radio scheme A are updated at a period $T_A$, while the valid periods of the common keys ($K_{B\ 1}$ to $K_{B\ 9}$) are updated at a period $T_B$ which is ⅔ of $T_A$. For this reason, the device 10a of the radio scheme A sets the number of common keys at the timing-r to be two ($K_{A\ 1}$, $K_{A\ 2}$), while the device 10b of the radio scheme B sets the number of the common keys at the timing-r to be three ($K_{B\ 1}$, $K_{B\ 2}$, $K_{B\ 3}$) which is 3/2 of the number (two) of the common keys ($K_{A\ 1}$ and $K_{A\ 2}$) of the device 10a, such that the valid periods of the common keys ($K_{A\ 1}$, $K_{A\ 2}$) of the device 10a and the valid periods of the common keys ($K_{B\ 1}$, $K_{B\ 2}$) become nearly the same. (In FIG. 24, "$\Delta t$" indicates that there is only a slight difference between the valid periods of the common keys of the device 10a and the device 10b.)

Consequently, the valid periods of the common keys of the devices 10a and 10b can be handled as nearly the same by setting the updating periods ($T_A$, $T_B$) and tile number of the common keys as described above, even when a part of the common keys available at the device 10a is deleted or a part of the common keys available at the device 10b is deleted. Also, the devices 10a and 10b can make the valid periods of the common keys available at the devices 10a and 10b nearly the same by updating the common keys at timings as described above, even when the common keys of the devices 10a and 10b using different radio schemes are different or their numbers are different.

(Effects of the Device Authentication Management System and the Device Authentication Management Method)

According to the device authentication management system and the device authentication management method according to this embodiment as described above, the selection unit 15c can select the second authentication information corresponding to the time according to the time attached by the time attaching unit 17 (the time at which the second authentication information is acquired from the authentication management unit 20), so that it becomes possible to select the second authentication information by using the above described time, rather than by using the identifier or the valid period information of the second authentication information. For this reason, the devices can select the authentication information that is common to the devices according to the time information of the second authentication information even when the second authentication informations available among the devices at some point are different.

According to this embodiment, there is no need for the devices to exchange the identifier information at a time of starting the communications, so that it is possible to realize the selection of the authentication information even in the case where the number of receivers of the communications is plural (the case where there are unspecified many receivers).

As described above, according to the device authentication management system and the device authentication management method of the present invention, each device 10 can acquire the identifiers contained in the second authentication information available at the other device 10, extract the identifiers common to the acquired identifiers and the identifiers contained in the second authentication information stored in the acquired information storage unit 12, and select one second authentication information corresponding to the valid period information according to the valid period information corresponding to the extracted identifiers, so that each device can carry out the authentication in order to carry out the communications with the other device as long as there is some authentication information that is common to the both devices among a plurality of the authentication informations available at the both devices, even if the authentication informations available at the both devices at some point are not the same (even if the end times of the valid periods of the authentication informations are different).

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A device authentication management system, comprising:
   an authentication management unit configured to manage a prescribed secret information; and
   a device configured to acquire the prescribed secret information from the authentication management unit and carry out an authentication in order to carry out communications with another device by using the prescribed secret information;
   wherein the authentication management unit has:
      a generation unit configured to generate the prescribed secret information that contains a first authentication information for carrying out communications between the authentication management unit and the device, and a second authentication information for carrying out communications between the device and the another device;
      a first authentication unit configured to carry out the authentication in order to carry out communications with the device, by using the first authentication information generated by the generation unit; and
      a first communication unit configured to transmit the second authentication information according to the authentication by the first authentication unit; and
   the device has:
      a second authentication unit configured to carry out the authentication in order to carry out communications with the first authentication unit by using the first authentication information acquired in advance from the authentication management unit; and
      a second communication unit configured to receive the second authentication information from the first communication unit according to the authentication by the second authentication unit.

2. The device authentication management system of claim 1, wherein the second authentication unit has a function for carrying out the authentication in order to carry out communications with the another device by using the second authentication information received by the second communication unit, and
   the second communication unit has a function for carrying out communications with the another device according to the authentication by the second authentication unit.

3. The device authentication management system of claim 2, wherein the generation unit generates the second authentication information which has an identifier for identifying the second authentication information and a valid period information for indicating a valid period during which the second authentication information can be used.

4. The device authentication management system of claim 3, wherein the device also has:
   a selection unit configured to acquire the identifiers contained in a plurality of the second authentication informations available at the another device, extract those identifiers that are common to acquired identifiers and the identifiers contained in a plurality of the second authentication informations available at the device, and select one of the second authentication informations corresponding to the valid period information among the second authentication informations corresponding to extracted identifiers according to the valid period information corresponding to the extracted identifiers; and
   the second authentication unit has a function for carrying out the authentication in order to carry out communications with the another device according to the second authentication information selected by the selection unit.

5. The device authentication management system of claim 2, wherein the device also has:
   a time attaching unit configured to attach a time information for indicating a time at which the second communication unit acquired the second authentication information from the authentication management unit, to the second authentication information; and
   a selection unit configured to acquire a plurality of the second authentication informations with the time information attached thereto by the time attaching unit, and select one of the second authentication information corresponding to the time information among the plurality of the second authentication informations with the time information attached thereto according to the time information; and
   the second authentication unit has a function for carrying out the authentication with the another device according to the second authentication information selected by the selection unit.

6. The device authentication management system of claim 2, wherein the generation unit generates the second authentication information at a prescribed period, and the device also has:
   a selection unit configured to acquire a plurality of the second authentication informations generated at the prescribed periods by the generation unit, and delete one of the plurality of the second authentication informations acquired when a number of the plurality of the second authentication informations exceeds a prescribed number.

7. The device authentication management system of claim 1, wherein the generation unit generates the second authentication information which has an identifier for identifying the second authentication information and a valid period information for indicating a valid period during which the second authentication information can be used.

8. The device authentication management system of claim 7, wherein the device also has:
   a selection unit configured to acquire the identifiers contained in a plurality of the second authentication informations available at the another device, extract those identifiers that are common to acquired identifiers and the identifiers contained in a plurality of the second authentication informations available at the device, and select one of the second authentication informations corresponding to the valid period information among the second authentication informations corresponding to extracted identifiers according to the valid period information corresponding to the extracted identifiers; and the second authentication unit has a function for carrying out the authentication in order to carry out communications with the another device according to the second authentication information selected by the selection unit.

9. The device authentication management system of claim 7 wherein the device also has:

a time attaching unit configured to attach a time information for indicating a time at which the second communication unit acquired the second authentication information from the authentication management unit, to the second authentication information; and a selection unit configured to acquire a plurality of the second authentication informations with the time information attached thereto by the time attaching unit, and select one of the second authentication information corresponding to the time information among the plurality of the second authentication informations with the time information attached thereto according to the time information; and the second authentication unit has a function for carrying out the authentication with the another device according to the second authentication information selected by the selection unit.

10. An authentication management device for use in a device authentication management system in which a device acquires a prescribed secret information from the authentication management device and carries out an authentication in order to carry out communications with another device by using the prescribed secret information, the authentication management device comprising:

a generation unit configured to generate the prescribed secret information that contains a first authentication information for carrying out communications between the authentication management device and the device, and a second authentication information for carrying out communications between the device and the another device;

an authentication unit configured to carry out the authentication in order to carry out communications with the device, by using the first authentication information generated by the generation unit; and a communication unit configured to transmit the second authentication information according to the authentication by the authentication unit.

11. A device for use in a device authentication management system in which the device acquires a prescribed secret information from an authentication management device and carries out an authentication in order to carry out communications with another device by using the prescribed secret information, the device comprising:

an authentication unit configured to carry out the authentication in order to carry out communications with the authentication management device by using the first authentication information acquired in advance from the authentication management device; and a communication unit configured to receive the second authentication information from the authentication management device according to the authentication by the authentication unit.

12. A device authentication management method in which a device acquires a prescribed secret information from an authentication management unit and carries out an authentication in order to carry out communications with another device by using the prescribed secret information, the device authentication management method comprising:

(a) generating the prescribed secret information that contains a first authentication information for carrying out communications between the authentication management unit and the device, and a second authentication information for carrying out communications between the device and the another device, at the authentication management unit;

(b) carrying out the authentication in order to carry out communications with the device, by using the first authentication information generated by the step (b), at the authentication management unit;

(c) transmitting the second authentication information according to the authentication by the step (b);

(d) carrying out the authentication in order to carry out communications with the authentication management unit by using the first authentication information acquired in advance from the authentication management unit, at the device; and (e) receiving the second authentication information from the authentication management unit according to the authentication by the step (d), at the device.

13. The device authentication management method of claim 12, further comprising:

(f) carrying out the authentication in order to carry out communications with the another device by using the second authentication information received by the step (e), at the device; and (g) carrying out communications with the another device according to the authentication by the step (f), at the device.

14. The device authentication management method of claim 13, wherein the step (a) generates the second authentication information which has an identifier for identifying the second authentication information and a valid period information for indicating a valid period during which the second authentication information can be used.

15. The device authentication management method of claim 14, further comprising:

(h) acquiring the identifiers contained in a plurality of the second authentication informations available at the another device, extracting those identifiers that are common to acquired identifiers and the identifiers contained in a plurality of the second authentication informations available at the device, and selecting one of the second authentication informations corresponding to the valid period information among the second authentication informations corresponding to extracted identifiers according to the valid period information corresponding to the extracted identifiers, at the device;

wherein the step (d) carries out the authentication in order to carry out communications with the another device according to the second authentication information selected by the step (k).

16. The device authentication management method of claim 13, further comprising:

(i) attaching a time information for indicating a time at which the step (e) acquired the second authentication information from the authentication management unit, to the second authentication information, at the device; and (j) acquiring a plurality of the second authentication informations with the time information attached thereto by the step (i), and selecting one of the second authentication information corresponding to the time information among the plurality of the second authentication informations with the time information attached thereto according to the time information, at the device; and wherein the step (d) carries out the authentication with the another device according to the second authentication information selected by the step (j).

17. The device authentication management method of claim 13, wherein the step (a) generates the second authentication information at a prescribed period, and the device authentication management method further comprises:

(k) acquiring a plurality of the second authentication informations generated at the prescribed periods by the step (a), and deleting one of the plurality of the second authentication informations acquired when a number of the plurality of the second authentication informations exceeds a prescribed number, at the device.

18. The device authentication management method of claim 12, wherein the step (a) generates the second authentication information which has an identifier for identifying the second authentication information and a valid period information for indicating a valid period during which the second authentication information can be used.

19. The device authentication management method of claim 18, further comprising:

(l) attaching a time information for indicating a time at which the step (e) acquired the second authentication information from the authentication management unit, to the second authentication information, at the device; and (m) acquiring a plurality of the second authentication informations with the time information attached thereto by the step (l), and selecting one of the second authentication information corresponding to the time information among the plurality of the second authentication informations with the time information attached thereto according to the time information, at the device; and wherein the step (d) carries out the authentication with the another device according to the second authentication information selected by the step (m).

20. The device authentication management method of claim 18, wherein the step (a) generates the second authentication information at a prescribed period, and the device authentication management method further comprises:

(n) acquiring a plurality of the second authentication informations generated at the prescribed periods by the step (a), and deleting one of the plurality of the second authentication informations acquired when a number of the plurality of the second authentication informations exceeds a prescribed number, at the device.

* * * * *